(12) United States Patent
Smith

(10) Patent No.: US 7,954,163 B2
(45) Date of Patent: May 31, 2011

(54) METHOD AND APPARATUS FOR PROVIDING NETWORK SECURITY USING ROLE-BASED ACCESS CONTROL

(75) Inventor: Michael R. Smith, Morgan Hill, CA (US)

(73) Assignee: Cisco Technology, Inc., San Jose, CA (US)

( * ) Notice: Subject to any disclaimer, the term of this patent is extended or adjusted under 35 U.S.C. 154(b) by 186 days.

(21) Appl. No.: 12/435,870

(22) Filed: May 5, 2009

(65) Prior Publication Data

US 2009/0217355 A1    Aug. 27, 2009

Related U.S. Application Data

(62) Division of application No. 10/659,614, filed on Sep. 10, 2003, now Pat. No. 7,530,112.

(51) Int. Cl.
*G06F 7/04* (2006.01)
*H04L 9/00* (2006.01)
*H04L 9/32* (2006.01)

(52) U.S. Cl. ........... 726/28; 726/3; 726/4; 726/5; 726/6; 726/7; 726/29; 726/30; 713/182; 713/161; 713/162; 713/163

(58) Field of Classification Search ............ 726/28
See application file for complete search history.

(56) References Cited

U.S. PATENT DOCUMENTS

| 4,922,486 A | 5/1990 | Lidinsky et al. ............ 370/60 |
| 5,017,917 A | 5/1991 | Fisher et al. ............ 340/14.1 |
| 5,113,442 A | 5/1992 | Moir ............ 713/167 |
| 5,251,205 A | 10/1993 | Callon et al. ............ 370/60 |
| 5,615,264 A | 3/1997 | Kazmierczak ............ 705/52 |
| 5,764,762 A | 6/1998 | Kazmierczak ............ 705/52 |
| 5,787,427 A | 7/1998 | Benantar et al. ............ 707/9 |
| 5,845,068 A | 12/1998 | Winiger ............ 395/186 |
| 5,911,143 A | 6/1999 | Deinhart et al. ............ 707/103 |
| 5,941,947 A | 8/1999 | Brown et al. ............ 709/225 |
| 5,968,177 A | 10/1999 | Batten-Carew et al. ............ 726/4 |
| 6,014,666 A | 1/2000 | Helland et al. ............ 707/9 |
| 6,023,765 A * | 2/2000 | Kuhn ............ 726/4 |

(Continued)

FOREIGN PATENT DOCUMENTS

EP    0 465 016 A2    6/1991

(Continued)

OTHER PUBLICATIONS

IEEE Standard for Information Technology—Telecommunications and Information Exchange Between Systems—Local and Metropolitan Area Networks—Common Specifications, *Part 3: Media Access Control (MAC) Bridges*, ANSI/IEEE Std. 802.1D, 1998 Edition, Dec. 10, 1998, pp. 1-355.

(Continued)

*Primary Examiner* — Longbit Chai
(74) *Attorney, Agent, or Firm* — Campbell Stephenson LLP

(57) ABSTRACT

A method and apparatus for providing network security using role-based access control is disclosed. A network device implementing such a method can include, for example, an access control list. Such an access control list includes an access control list entry, which, in turn, includes a user group field. Alternatively, a network device implementing such a method can include, for example, a forwarding table that includes a plurality of forwarding table entries. In such a case, at least one of the forwarding table entries includes a user group field.

30 Claims, 16 Drawing Sheets

U.S. PATENT DOCUMENTS

| | | | |
|---|---|---|---|
| 6,088,659 A | 7/2000 | Kelley et al. | 702/62 |
| 6,092,191 A | 7/2000 | Shimbo et al. | 713/153 |
| 6,202,066 B1 | 3/2001 | Barkley et al. | 707/9 |
| 6,212,558 B1 | 4/2001 | Antur et al. | 709/221 |
| 6,233,618 B1 | 5/2001 | Shannon | 709/229 |
| 6,289,462 B1 | 9/2001 | McNabb et al. | 713/201 |
| 6,292,798 B1 | 9/2001 | Dockter et al. | 707/9 |
| 6,292,900 B1 | 9/2001 | Ngo et al. | 713/201 |
| 6,304,973 B1 | 10/2001 | Williams | 713/201 |
| 6,405,259 B1 | 6/2002 | Cheston et al. | 709/245 |
| 6,449,643 B1 | 9/2002 | Hyndman et al. | 709/223 |
| 6,711,172 B1 | 3/2004 | Li | 370/401 |
| 6,754,214 B1 | 6/2004 | Mahalingaiah | 370/392 |
| 6,823,462 B1 | 11/2004 | Cheng et al. | 726/15 |
| 6,973,057 B1 | 12/2005 | Forslow | 370/328 |
| 6,985,948 B2 | 1/2006 | Taguchi et al. | 709/225 |
| 7,000,120 B1 | 2/2006 | Koodli et al. | 713/201 |
| 7,032,243 B2 | 4/2006 | Leerssen et al. | 726/17 |
| 7,136,374 B1 | 11/2006 | Kompella | 370/352 |
| 7,207,062 B2 | 4/2007 | Brustoloni | 726/13 |
| 7,284,269 B2 | 10/2007 | Marquet et al. | 726/13 |
| 7,350,077 B2 | 3/2008 | Meier et al. | 713/171 |
| 7,417,950 B2 | 8/2008 | Hofmeister et al. | 370/230 |
| 7,437,755 B2 | 10/2008 | Farino et al. | 726/5 |
| 7,506,102 B2 | 3/2009 | Lev-Ran et al. | 711/118 |
| 7,530,112 B2 | 5/2009 | Smith | 726/28 |
| 2002/0026592 A1 | 2/2002 | Gavrila et al. | 713/201 |
| 2002/0035635 A1 | 3/2002 | Holden | 709/230 |
| 2002/0184521 A1 | 12/2002 | Lucovsky et al. | 713/200 |
| 2003/0051155 A1 | 3/2003 | Martin | 713/201 |
| 2003/0088786 A1 | 5/2003 | Moran et al. | 713/201 |
| 2003/0110268 A1 | 6/2003 | Kermarec et al. | 709/227 |
| 2003/0140246 A1 | 7/2003 | Kammer et al. | 713/201 |
| 2003/0145232 A1 | 7/2003 | Poletto et al. | 726/22 |
| 2003/0154400 A1 | 8/2003 | Pirttimaa et al. | 713/201 |
| 2004/0017816 A1 | 1/2004 | Ishware et al. | 370/395.53 |
| 2004/0044908 A1 | 3/2004 | Markham et al. | 713/201 |
| 2004/0064688 A1 | 4/2004 | Jacobs | 713/150 |
| 2004/0156313 A1 | 8/2004 | Hofmeister et al. | 370/229 |
| 2004/0160954 A1 | 8/2004 | Gai et al. | 370/254 |
| 2004/0181690 A1 | 9/2004 | Rothermel et al. | 713/201 |
| 2004/0202171 A1 | 10/2004 | Hama | 370/395.1 |
| 2004/0264697 A1 | 12/2004 | Gavrilescu et al. | 380/255 |
| 2005/0055573 A1 | 3/2005 | Smith | 713/201 |
| 2005/0097357 A1 | 5/2005 | Smith | 713/201 |
| 2005/0129019 A1 | 6/2005 | Cheriton | 370/392 |
| 2005/0177717 A1 | 8/2005 | Grosse | 713/160 |
| 2005/0190758 A1 | 9/2005 | Gai et al. | 370/389 |
| 2005/0198412 A1 | 9/2005 | Pedersen et al. | 710/30 |
| 2006/0010483 A1 | 1/2006 | Buehler | 726/1 |
| 2006/0090208 A1 | 4/2006 | Smith | 726/26 |
| 2006/0106750 A1 | 5/2006 | Smith | 707/1 |
| 2006/0112425 A1 | 5/2006 | Smith et al. | 726/13 |
| 2006/0112426 A1 | 5/2006 | Smith et al. | 726/13 |
| 2006/0112431 A1 | 5/2006 | Smith et al. | 726/22 |
| 2006/0117058 A1 | 6/2006 | Smith et al. | 707/102 |
| 2007/0094716 A1 | 4/2007 | Farino et al. | 726/5 |
| 2009/0049196 A1 | 2/2009 | Smith et al. | 709/245 |
| 2009/0097490 A1 | 4/2009 | Sanderson et al. | 370/395.53 |

FOREIGN PATENT DOCUMENTS

| | | | |
|---|---|---|---|
| EP | 0 697 662 A1 | 2/1996 | 12/14 |
| EP | 0 849 680 A2 | 12/1997 | |
| EP | 1 067 745 A2 | 11/1999 | |
| JP | 2002 164937 | 6/2002 | |
| WO | WO 2005/027464 | 3/2005 | |

OTHER PUBLICATIONS

Computer Systems Laboratory, National Institute of Standards and Technology, *Standard Security Label for Information Transfer*, Federal Information Processing Standards Publication 188 (FIPS PUB 188), Category: Computer Security, Subcategory: Security Labels, Sep. 6, 1994, pp. 1-25.

Microsoft® Computer Dictionary, Fifth Edition, Publisher: Microsoft Press, Pub. Date: May 1, 2002, Excerpt of terms: digital signature -digital signature standard & routable protocol—routing table, p. 656.

Stevens, Richard W., TCP/IP Illustrated vol. 1, The Protocols, Copyright © 1994 Addison Wesley Longman, Inc., pp. 112-117.

CDAT Overview, http:www.cisco.com/universalcd/cc/td/doc/,Solution/sesm/sesm_313toolguid/chil_overview.htm., Copyright 1992-2002 Cisco Systems, Inc.

Wang, Ning and Pavlou, George, Scalable Sender Access Control for Bi-directional Multicast Routing, Computer Networks, Elsevier Science Publishers B.V., vol. 43, No. 5, Dec. 5, 2003, pp. 539-555.

Valenzi, Kathleen D., Digital Signatures: An Important "Sign" of the Future of E-Government, Virginia.Edu, vol. IV, No. 2, Fall 2000. Copyright 2000. The Rector and Board of Visitors of the University of Virginia, 6 pages.

Pfleeger et al., Security in Computing, 2003, Prentice Hall, 3$^{rd}$ Ed., pp. 194-207.

Islam, An Access Control Method with Subject-Object Key and Time Stamp, Jun. 2003, Malaysian Journal of Computer Science, vol. 16, No. 1, pp. 77-83.

Barkley et al., Supporting Relationships in Access Control Using Role Based Access Control, Jul. 1999.

CDAT Overview, http:www. cisco.com/universalcd/cc/td/doc/,Solution/sesm/sesm_313toolguid/chil_overview.htm., Copyright 1992-2002 Cisco Systems, Inc.

\* cited by examiner

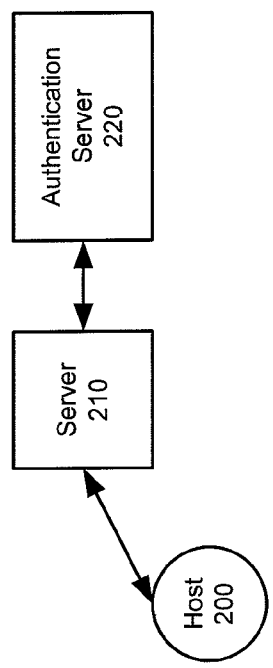

*Fig. 7*

METHOD AND APPARATUS FOR PROVIDING NETWORK SECURITY USING ROLE-BASED ACCESS CONTROL

CROSS REFERENCE TO RELATED APPLICATIONS

This application is a divisional of U.S. patent application Ser. No. 10/659,614, filed Sep. 10, 2003 and entitled "METHOD AND APPARATUS FOR PROVIDING NETWORK SECURITY USING ROLE-BASED ACCESS CONTROL," issued as U.S. Pat. No. 7,530,112 on May 5, 2009, and having Michael R. Smith as the inventor. This application is assigned to Cisco Technology, Inc., the assignee of the present invention, and is hereby incorporated by reference, in its entirety and for all purposes.

BACKGROUND OF THE INVENTION

1. Field of the Invention

This invention relates to the field of information network security, and more particularly relates to a method and apparatus for securing access to a network by a user based on the user's role.

2. Description of the Related Art

Flexible network access technologies such as wireless, Dynamic Host Configuration Protocol (DHCP), virtual private network (VPN) gateways and the like allow users access to a given protected network from a variety of access or entry points. This is true of all manner of networks, including enterprise networks, service provider networks and the like. At the same time, the security afforded while providing such access is of increasing concern. Technologies based on Remote Authentication Dial-In User Service (RADIUS), Terminal Access Controller Access Control System (TACACS), the DIAMETER protocol and other protocols allow a user to be authenticated upon entry to the network.

As is known, communications paths across such networks are conceptually separate (e.g., can be viewed as separate virtual paths), although they may traverse some or all of the same network devices (i.e., physical segments), and so are controlled separately using, for example, access control lists (ACLs). Conventionally, constraints upon access enjoyed by network users are enforced by ACLs, which are used to process packets and so control the network traffic of such users. For scalability and manageability, conventional ACLs require the mapping of a user host address (as the source of the given packet(s); for example, an internet protocol (IP) address) to be relatively static, or the security policy be sufficiently lax to allow all possible addresses possible for the user.

Today's security ACLs suffer from a number of infirmities. These ACLs are conventionally applied to a given interface and contain IP addresses which tie the security policy directly to the network topology. As a result, a change in the network such as repartitioning of sub-nets causes the security policy to be revisited. Moreover, it would appear that ACLs in various parts of the network would need to be updated each time a user authenticated to the network, in order to add rules associated with the source IP address assigned to this user's host, which would be specific to that user. This would cause a huge increase in the number of unique ACLs and dramatically increase the rate at which such rules would have to be updated.

Within a given ACL, there also exists the problem of dramatic increases in size resulting from the expression of individual IP addresses, where the number of entries is often the number of source addresses multiplied by the number of destination addresses, multiplied by the number of permissions. Thus, the addition of a single individual IP address can have a significant impact on the size of a substantial number of ACLs.

When a customer changes the network topology, the ACLs must be reexamined. Since such ACLs can quite easily reach several hundred or even several thousand of lines in length, such a reexamination can be non-trivial, to say the least. Due to the complexity of such an ACL, the confidence in the changes that are made is not very high, typically, and the ACLs often require extensive testing by the user before being placed in a production environment. Moreover, because platforms using content-addressable memories (CAMs) to implement ACLs require recompiling of some or all of the ACLs when any change is made, the increases in processing cost can be quite severe, approaching a quadratic in the number of users. These increases in complexity increase the chance of a network outage, a security hole, or both. A single ACL stretches a user's ability to manage their security policy. Placing such ACLs throughout the enterprise network therefore impacts the manageability of today's networks. Given the foregoing, particularly in light of the increasingly flexible access that is required now and will be required in the future, relying on existing ACL-based solutions is difficult.

What is required, then, is a mechanism that allows for the efficient identification of network traffic from a given host. Preferably, such an approach should employ existing ACL technology, while reducing or eliminating the problem of multiplicative ACL growth that is currently encountered when adding hosts. Also preferably, such an approach should allow the network to be easily reconfigured and grow, without incurring a disproportionate administrative burden or consuming inordinately large amounts of network resources.

SUMMARY

In one embodiment, a network device is disclosed. The network device includes an access control list. The access control list includes an access control list entry, which, in turn, includes a user group field. In another embodiment, the network device includes a forwarding table. The forwarding table includes a plurality of forwarding table entries. In such an embodiment, at least one of the forwarding table entries includes a user group field.

In yet another embodiment, a method for providing network security using role-based access control is disclosed. The method includes comparing a user group of a packet with a user group of a destination of the packet.

In still another embodiment, a method is disclosed in which an access control list is populated with a destination user group identifier. The destination user group identifier identifies a destination user group of a destination. In yet another embodiment, a method is disclosed in which a forwarding table is populated with a user group identifier.

The foregoing is a summary and thus contains, by necessity, simplifications, generalizations and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and numerous objects, features, and advantages made apparent to those skilled in the art by referencing the accompanying drawings.

FIG. 2 is a block diagram illustrating an architecture for user authentication.

FIG. 3 is a block diagram illustrating a forwarding table according to embodiments of the present invention.

FIG. 7 is a block diagram illustrating an example of an access control list (ACL) according to embodiments of the present invention.

The use of the same reference symbols in different drawings indicates similar or identical items.

DETAILED DESCRIPTION OF THE INVENTION

Figure 1A:
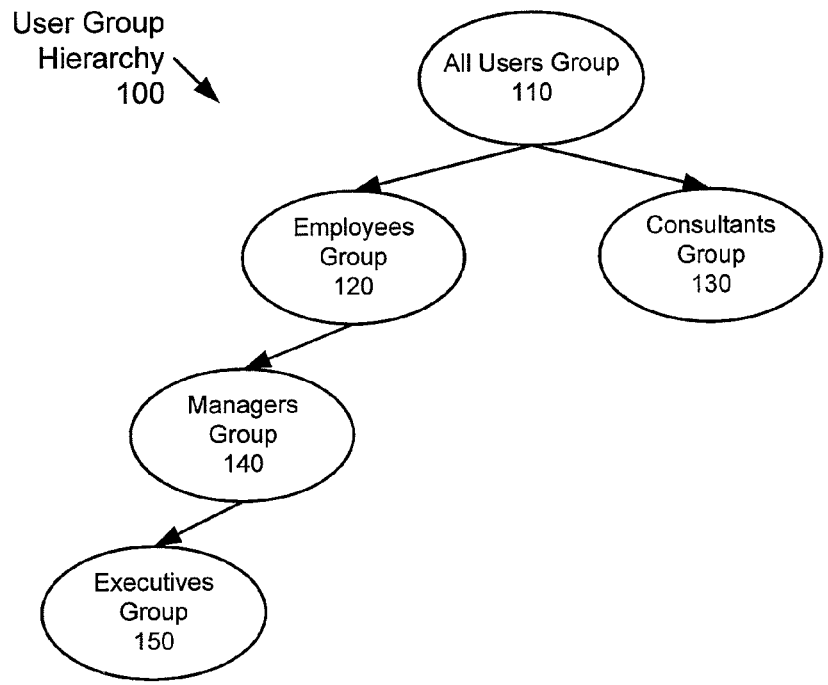
FIG. 1A is a diagram illustrating a hierarchical user group according to embodiments of the present invention.

The following is intended to provide a detailed description of an example of the invention and should not be taken to be limiting of the invention itself. Rather, any number of variations may fall within the scope of the invention which is defined in the claims following the description.

Introduction

The present invention provides a method and apparatus that addresses the limitations outlined above through the use of role-based access control lists (RBACLs), which are designed to directly address such problems. The network access permitted a user (e.g., a person having a user identifier, a server, internet protocol (IP) telephone, and other such network devices) is conventionally based on the group(s) to which the user belongs, the role(s) assigned to the user by the enterprise, the privilege(s) the user has as an ISP customer or similar criteria. It will be appreciated that such a user can, in fact, be a person having a user identifier, a network device, a telecommunications device or some other identifiable device or entity with a need for access to a communications network. RBACLs control network traffic by enforcing the permissions to be applied to that network traffic, based on the role(s) of the user generating the network traffic.

A method and apparatus according to the present invention represent user roles using groups. A user is given membership in one or more groups based on that user's roles. Each group may represent one or more roles. In turn, permission lists are applied in deciding whether to permit communication between groups. A user's group can be assigned, for example, when the network entity (e.g., a user) is authenticated (e.g., as part of user authentication via the 802.1X protocol, or other such mechanism). Thus, when the entity authenticates, the entity is placed into a "user group" (UG). Authentication can be based on user identification, server function in the network, or other such characteristic.

This information can then be used to make a determination as to the handling of a packet sourced by the entity. For example, when a packet is sourced onto the network, information regarding the source's group is inserted into the packet. Communication of this information (also referred to herein as a tag) can be implemented in a number of ways. For example, the information can be implemented as a source group tag (a tag indicating the group to which the source belongs), although other methods can be employed.

As the packet traverses the network, the source group information is carried along with the other information in the packet. At the egress edge of the network, the destination group can be derived. For example, at the "L3" edge (the network device at the edge of the layer 3 network), the destination group can be derived from the network device's forwarding information base (FIB) via the fully resolved host prefix. The host prefix is resolved through the address resolution protocol (ARP). The ARP response is tagged with the destination group when the packet is sourced onto the network. The FIB result is populated with the destination group in addition to the rewrite information. Once the source and destination groups have been determined, the permissions (ACL) can be applied using this information.

Key advantages of the present invention include the multiplicative reduction of the ACL's size, multiplicative increase in software ACL performance, decoupling of the network's topology and the security (or other features) policies (allowing ACLs to follow the user as the user moves through the enterprise), and simplified network management.

The Implementation of Roles in an Authentication Architecture

FIG. 1A is a diagram illustrating a hierarchical user group according to embodiments of the present invention. Hierarchical user groups (UGs) are similar to class hierarchies found in object oriented programming. Each child group inherits permissions from its parent group and extends those permissions with its own. A user group hierarchy 100 is depicted as including a number of user groups, each of which has dependencies on other user groups. User group hierarchy 100 includes an all users group 110, an employees group 120, a consultants group 130, a managers group 140 and an executives group 150. As can be seen in FIG. 1A, these groups are hierarchically related to one another, with executives group 150 being a subset of managers group 140, managers group 140 being subset of employees group 120, and employees group 120 and consultants group 130 being subsets of all users group 110. In this manner, access to various resources can be limited based on the group(s) to which a user belongs. For example, a user may belong to managers group 140. Typically, a user in managers group 140 will have access to more of the computing and informational resources of the organization than will a user in employees group 120, and less of such access than a user in executives group 150. As will be apparent, the farther one traverses down in user group hierarchy 100, the greater the level of responsibility, and so, the greater the amount of access.

Figure 1B:
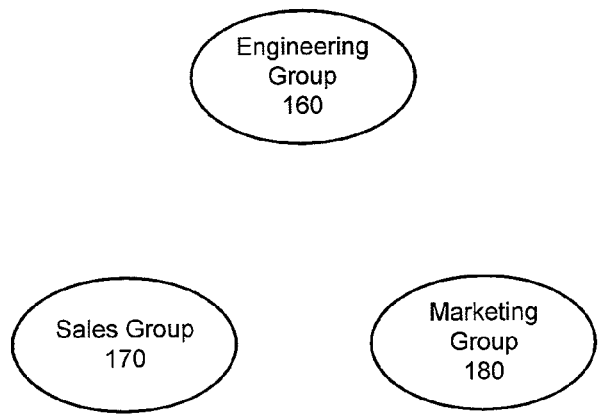
FIG. 1B is a diagram illustrating a disjoint set of user groups according to embodiments of the present invention.

FIG. 1B is a diagram illustrating a disjoint set of user groups according to embodiments of the present invention. Disjoint user groups are used where there are non-overlapping, equal, and non-related functions. In the actual implementation of RBACLs, hierarchical UGs can be implemented using disjoint UGs and the hierarchy management (if present) can be made the responsibility of the network management entity responsible for configuring the RBACLs. These groups include an engineering group 160, a sales group 170 and a marketing group 180. Such disjoint user groups are used where there are non-overlapping, equal and non-related functions performed by the groups in question. Because the responsibilities of each of these groups is so different and distinct from that of the other groups, each of these groups would be expected to have their own set of resources, accessible by members of the given group. Thus, it would expected that the users in a given group would maintain the same set of permissions, allowing them access to the same set of resources, although this need not strictly be the case.

It will be appreciated that groups of users are put into the same group because they share the same permissions. This creation of groups does not imply that no communications occur between or across user groups. Nor does this imply that there is no permission enforcement within a given group. It simply implies that as a group, the users will have the same privileges within the network.

It should be noted that the implementation of role-based access control presents special problems in a network environment. Due to the bidirectional nature of network communications, access control needs to be applied both between the user (host) and the object (server), and between the object (server) and the user (host). This requires the users to be grouped together into a role and, similarly, the objects to also be grouped together in a role. At this point, the access control is applied strictly between the groups. With such a decoupling, the network devices are free to move throughout the network, and change IP addresses. Entire network topologies can change without disrupting the security policies implemented by the existing RBACLs. As long as the roles and the permissions remain the same, such changes can occur without affecting the security policy in place. From the view of any given packet, the packet is simply being sourced from one group, destined for another group, where the two groups may or may not be different. The question answered through the use of RBACLs is whether, based on the source and destination group, the packet's conveyance is allowable.

The implementation of RBACLs typically includes a number of operations. These operations include
1. Source User Group (SUG; or user) determination
2. Destination User Group (DUG; or object) determination
3. Permissions determination
4. Permissions enforcement FIG. 2 is a block diagram illustrating an architecture for user authentication. SUG determination can be made, for example, when the user is authenticated on the network. The following examples can use, for example, the remote authentication dial-in user server (RADIUS) protocol, which provides centralized authentication, authorization and accounting for various types of access. User authentication is initiated by a user, who attempts to log in to a host 200. The user (not shown) causes host 200 to act as a supplicant, and so, send a start message to a server 210 (also referred to as an authenticator). Server 210 responds to host 200 with a request/identify message, to which host 200 responds with a response/identity message, based on the user's response. This response/identity message can be, for example, the typical user name and password combination. Server 210 passes this information to an authentication server 220.

Authentication server 220 responds with an access-challenge. It will be noted that a variety of exchanges occur between server 210 and authentication server 220 during authentication, and that these are meant to be merely exemplary. Such exchanges will vary, depending on the authentication protocol employed. Once the access-challenge exchange has completed, server 210 interacts with host 200 by forwarding the challenge from authentication server 220 to host 200. Host 200, in this example, responds with a one time password (OTP), which server 210 forwards to authentication server 220. Assuming that the password is accepted by authentication server 220, authentication server 220 responds with an access-accept message that causes server 210 to authorize a network address for host 200.

Embodiments of the present invention rely on this authentication process to allow for the dissemination of user group information. The present invention can employ an authentication procedure such as that presented in connection with FIG. 2 to provide the ability to transport the user's group membership from authentication server 220 to an ingress network access device. In the RADIUS protocol, a vender-specific attribute containing the user group to be passed to server 210 (and, ultimately, to the ingress switch) uses the RADIUS access-accept response. Thus, the source user group determination is made when the user is authenticated on the network. Alternatively, if the host's operating system is trusted, the user group can come from the host itself. If such is the case, each application may tag a given packet differently, based on the application sourcing the packet.

It will be noted that, in the original IEEE 802.1X specification, the entire port is authenticated when a single valid authentication is made on the port. Thereafter, any host attached to that port is considered authenticated. In the same manner, the simplest method of obtaining the source group tag (SGT) is to mark the entire port as authenticated upon the first valid authentication. The group identifier provided by the initial authentication is then used and installed in the ingress port.

FIG. 3 is a block diagram illustrating a forwarding table 300 according to the present invention. Forwarding table 300 includes a number of forwarding table entries (depicted in FIG. 3 as forwarding table entries 310(1)-(N)). Each of forwarding table entries 310(1)-(N) includes a number of fields, certain of which are depicted in FIG. 3. Among these fields are a MAC address field (depicted as MAC address fields 320(1)-(N)), a virtual local area network (VLAN) identifier field (depicted as VLAN identifier fields 330(1)-(N)), a port identifier field (depicted as port identifier fields 340(1)-(N)), and a user group identifier (tag) field (depicted as user group identifier fields 350(1)-(N)).

When the media access control (MAC) address and VLAN have been authenticated on a given port, the user group retrieved via the RADIUS authentication is assigned to the MAC address/VLAN identifier combination. This information appears in forwarding table 300 in MAC address fields 320(1)-(N) and VLAN identifier fields 330(1)-(N). Forwarding table 300 thus contains the MAC address/VLAN identifier combinations that can be used as a look-up key with the result of the look-up providing the port identifier (as stored in the appropriate one of port identifier fields 340(1)-(N)) and the user group identifier (as stored in a corresponding one of user group identifier fields (350(1)-(N)). The particular one of forwarding table entries 310(1)-(N) is preferably static on the ingress switch, and in such a case, removal should be triggered by the authentication protocol employed, and not the aging criteria that are typically employed with forwarding table entries.

It will be noted that, in one implementation, when a packet is sent by a host such as host 200, the layer 2 learning look-up (provided as part of the rigging function in the network switch that maintains forwarding table 300) also derives the user group identifier for the packet by looking up the packet's contents in the forwarding table. Alternatively, the switch's layer 2 learning look-up can be designed to extract the user group identifier from the packet itself. This user group identifier is used to tag the packet for identification as having been generated by a user in the given user group. Such a tag is referred to herein as the source group tag (SGT). This SGT is inserted into the packet for use in the subsequent processing of the packet. For example, the SGT can be inserted into the layer 2 header, making such information available to layer 3 routers, as well as layer 2 switches.

It will be noted that the variable identifier "N" is used in several instances in the figures described herein to more simply designate the final element of a series of related or similar elements. The repeated use of such variable identifiers is not meant to necessarily imply a correlation between the sizes of such series of elements, although such correlation may exist. The use of such variable identifiers does not require that each series of elements has the same number of elements as another series delimited by the same variable identifier. Rather, in each instance of use, the variable identified by "N" (or any other such identifier) may hold the same or a different value than other instances of the same variable identifier.

Moreover, regarding the signals described herein, those skilled in the art will recognize that a signal may be directly transmitted from a first block to a second block, or a signal may be modified (e.g., amplified, attenuated, delayed, latched, buffered, inverted, filtered or otherwise modified) between the blocks. Although the signals of the above described embodiment are characterized as transmitted from one block to the next, other embodiments of the present invention may include modified signals in place of such directly transmitted signals as long as the informational and/or functional aspect of the signal is transmitted between blocks. To some extent, a signal input at a second block may be conceptualized as a second signal derived from a first signal output from a first block due to physical limitations of the circuitry involved (e.g., there will inevitably be some attenuation and delay). Therefore, as used herein, a second signal derived from a first signal includes the first signal or any modifications to the first signal, whether due to circuit limitations or due to passage through other circuit elements which do not change the informational and/or final functional aspect of the first signal.

Before the appropriate RBACL can be applied, a determination is also made as to the destination user group. While a number of mechanisms can be used to make such a determination, two ways to determine the DUG of the object (server) are now discussed. As will be appreciated, each has its own advantages in certain scenarios.

The first mechanism to determine DUG employs information in the forwarding information base (FIB) provided during address resolution by the address resolution protocol (ARP) (i.e., the IP FIB). For most cases involving network traffic using IP, the destination user group can be derived from the FIB. On the egress network layer 3 (L3) edge of the network, the FIB will be populated with the resolved host prefix after ARP resolution is performed. Since the ARP response is the trigger for the FIB entry update and needs to be received before any traffic flows to the host, the ARP response is used as the trigger to insert the destination user group into the FIB entry.

The exact method of deriving the destination user group depends on the platform and network connectivity to the host. The following are the three different possible scenarios for deriving the destination user group.

In the first scenario, the host is authenticated directly with the router. In this case, the host is directly connected to a traditional router (one without network layer 2 (L2) switching). When the ARP response is received, the local authentication database will be queried to retrieve the corresponding user group for the destination IP address. If no entry is found in the local authentication database, a default destination user group will be assigned.

In the second scenario, the host is authenticated directly with the directly-connected network layer 2 (L2) switch. When the host authenticates with the directly connected L2 switch, the router may be multiple hops away within network layer 2. When the ARP response is received by the edge switch directly connected to the host, the packet is tagged with the SGT by one of the mechanisms as described previously. When the ARP response is received by the router that triggered the ARP request, the destination user group will be taken from the packet itself.

In the third scenario, the host is authenticated directly with the network layer 3 (L3) switch. In this case, the host is directly connected to the L3 switch providing the authentication and the edge L3 interface for the host. It will be noted that the term, "L3 switch", refers to a router with the additional functionality of an L2 switch. When the ARP response arrives from the host, the packet is marked with the SGT from the media access control (MAC) layer, VLAN learning lookup in the L2 table. In this manner, the L3 switch can view this case as the same as the previous scenario.

Alternatively, the destination user group can be determined via a static ingress ACL. As will be appreciated, when connecting an RBACL-enabled network to a non-RBACL-enabled network, the authentication infrastructure will not be present in the non-RBACL-enabled network. In a manner similar to assigning the source user group described previously, the destination user group needs to be classified via the same mechanism in such situations. By using the ingress ACL to provide the destination user group classification, the destination IP addresses/sub-nets can indicate the destination user group to determine the correct RBACL to apply. It will be noted that the egress ACL may also be used, so long as the DUG determination occurs before the RBACL enforcement. It will be appreciated that, not infrequently, it is better to check using an egress ACL.

Figure 4:
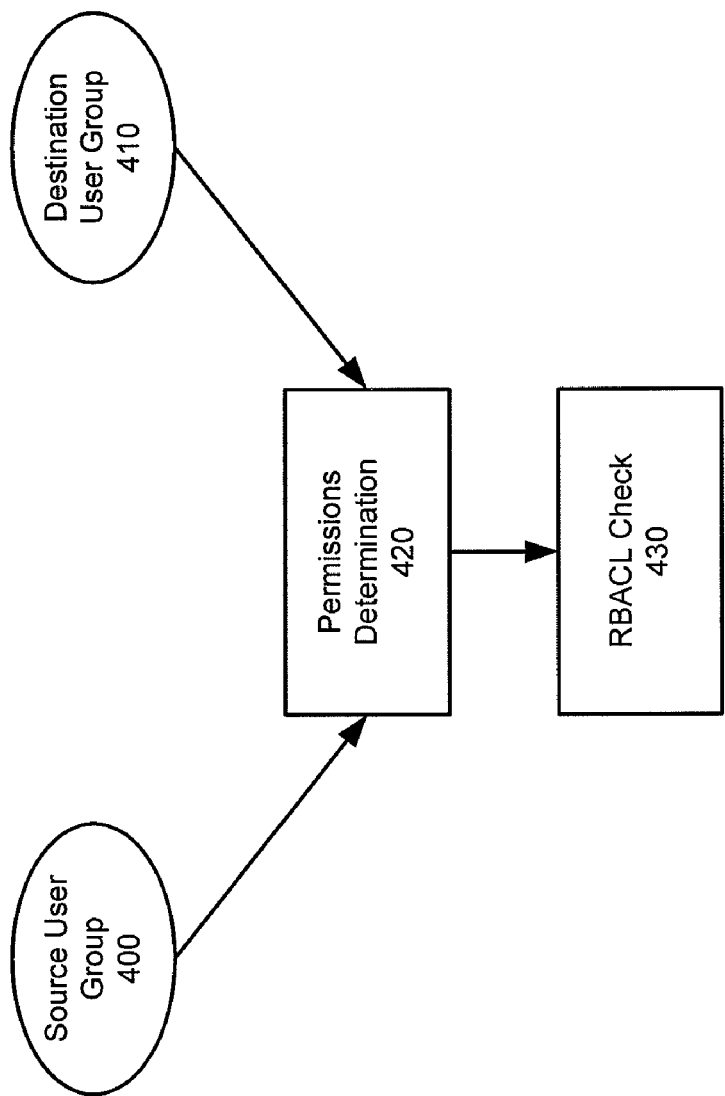
FIG. 4 is a diagram illustrating a process of determining applicable permissions for a packet.

FIG. 4 is a diagram illustrating a process of determining applicable permissions for a given packet, using the operations discussed above. The packet's source user group (depicted in FIG. 4 as a source user group (SUG) 400) and destination user group (depicted as a destination user group (DUG) 410) are taken as inputs to a permissions determination process (depicted as a permissions determination 420). Thus, the SUG and DUG are thus inputs to the process of determining which permissions to apply, as has been described. Permissions determination 420 will typically employ a permission list. The permission list determination is performed through the usage of an access control matrix, which is, in certain embodiments, a matrix indexed by the source and destination groups in order to provide a list of allowed permissions. In the case posited here, the source user group and destination user group are employed to make this determination. The results of permissions determination 420 are then checked in an RBACL check 430. Thus, the SUG and DUG are used to determine the RBACL (permission list) that applies.

An Example of a Software-Based Permissions Architecture

Figure 5:
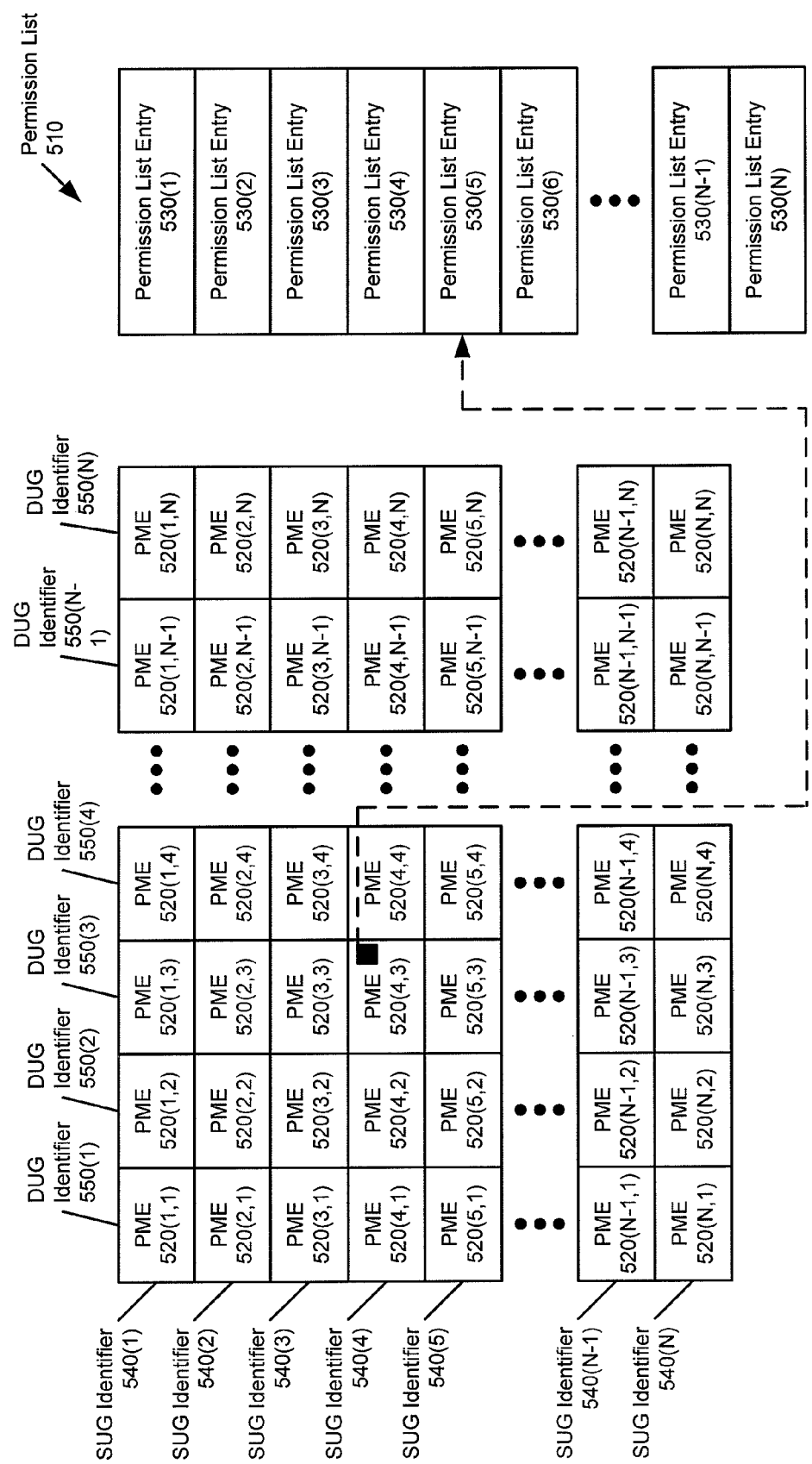
FIG. 5 is a block diagram illustrating a permissions matrix according to embodiments of the present invention.

FIG. 5 is a block diagram illustrating a permissions matrix 500 and a permission list 510, according to the present invention. Each of the entries in permissions matrix 500 (depicted as permissions matrix entries 520(1,1)-(N,N)) point to one of the entries in permission list 510 (depicted as permission list entries 530(1)-(N)). Each of permissions matrix entries (PME) 520(1,1)-(N,N) is indexed by one of a number of source user group identifiers 540(1)-(N) and one of a number of destination user group identifiers 550(1)-(N). As will be apparent, each of source user group identifiers 540(1)-(N) corresponds to a row in permissions matrix 500, while each of destination user group identifiers 550(1)-(N) corresponds to a column in permissions matrix 500. Each of permission list entries 530(1)-(N) provides a list of permissions as to the kinds of network traffic that are permitted between the source user group and destination user group. For example, given a source user group identifier of four (4) and a destination user group identifier of three (3), PME 520(4,3) is identified. PME 520(4,3) includes a pointer to permission list entry 530(5). Permission list entry 530(5) might contain a permission list such as the following:

permit tcp www
    permit tcp telnet
    permit tcp ftp
    permit tcp ftp-data
    implicit deny As noted, these permissions are typically very few in comparison to traditional ACLs. This is because such permissions are not applied to all network traffic traversing a given interface, but only to traffic between two specific user groups. For example, specification of the types of traffic allowed in from the Internet (the interface ACL) is no longer needed—only the types of traffic allowed coming in from the Internet to certain servers need be specified (in the RBACL permission list).

Typically, the permission matrix will be very sparsely populated. However, there is a scenario where a particular column or row of the matrix may be fully populated. If we view the security policy as a list of permission sets between source and destination groups, the security policy can be defined as:

TABLE 1

| Permission matrix example. | | |
|---|---|---|
| SUG1 | DUG4 | PermissionListA |
| SUG2 | DUG5 | PermissionListB |
| SUG3 | DUG6 | PermissionListC |

Figure 6A:
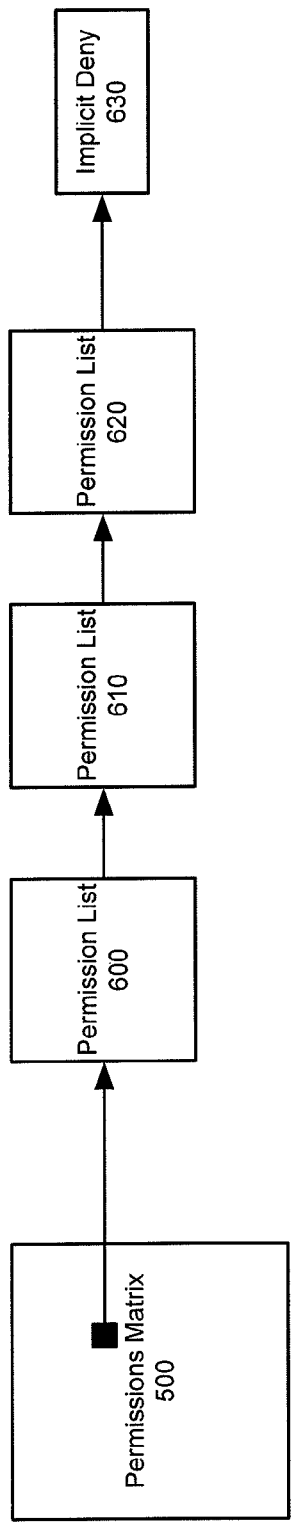
FIG. 6A is a block diagram illustrating an example of permissions matrix chaining according to embodiments of the present invention.

FIG. 6A is a block diagram illustrating an example of permissions matrix chaining according to the present invention. In this scenario, the pointer that is selected in permissions matrix 500 points to one of a number of permission lists (depicted in FIG. 6A as a permission list 600, a permission list 610, and a permission list 620), which, in turn, point to one another and are terminated by an implicit deny permission (depicted as implicit deny 630 in FIG. 6A). An example of permission lists 600, 610 and 620 is given in Table 1 above.

Thus, as can be seen, permission list 620 builds on the permissions listed in permission list 610, which in turn, builds on the permissions list listed in permission list 600. As with a typical permission list, the list is terminated by an implicit deny, indicating that, unless otherwise specifically allowed, no permissions are granted.

In the manner depicted in FIG. 6A, a list of permissions can be created for each of the entries in permissions matrix 500 by simply combining permission lists (e.g. permission lists 600, 610, and 620, as well as other such permission lists) to arrive at the desired set of permissions for the source user group and destination user group combination represented by the entry in permissions matrix 500 that points to the given group of permission lists.

A desirable feature is to allow a network's security administrator to specify a permission list for any source group communicating with a specific destination group and vice versa. If a group identifier is a single identifier without any semantics encoded in the value, providing variable masking of the group identifier is of little value. However, masking the entire group identifier addresses the above need. This leads to the 4 possible forms of specifying a permission list assignment.

| | | |
|---|---|---|
| SUGx | DUGy | PermissionList1 |
| ANY | DUGy | PermissionList2 |
| SUGx | ANY | PermissionList3 |
| ANY | ANY | PermissionList4 |

It will be noted that the final form (ANY to ANY) would fill the entire matrix with the ACL PermissionList4. Such a configuration can lead to a given packet potentially needing multiple permission lists to be applied. Conceptually, the matrix points to a chain of permission lists (as in FIGS. 6A and 6B), where each is traversed in order. As depicted, each permission list is terminated with an implicit continue, and the implicit deny is applied at the end of the chain.

In fact, the pointer structures that support such combinations can be separated from the permission lists themselves, simplifying the pointer structures and reducing the duplication of permission information. Such an approach is discussed below in connection with FIG. 6B.

Figure 6B:
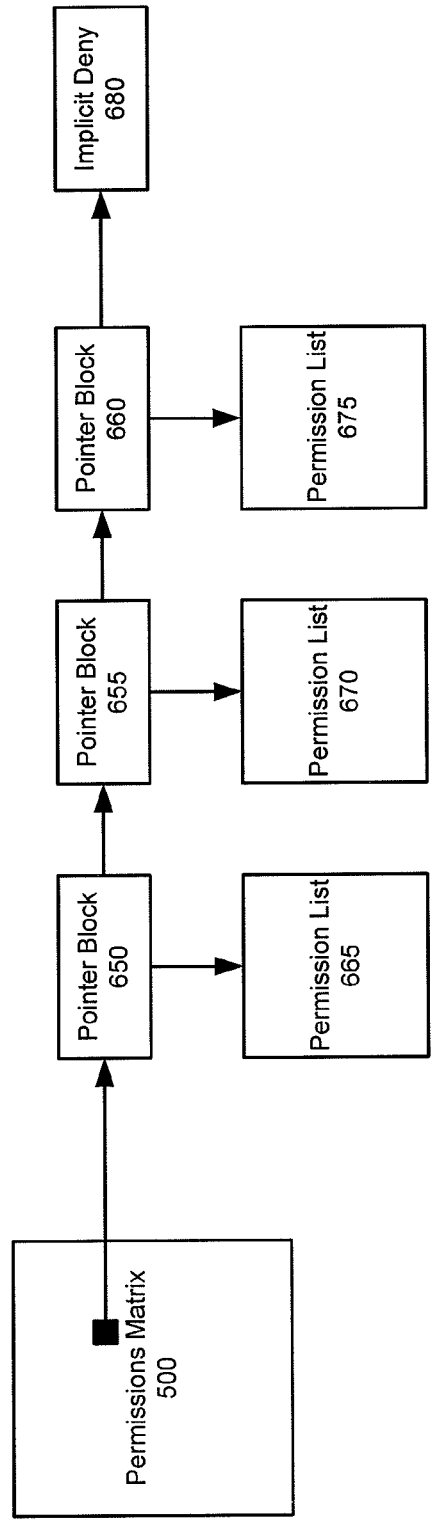
FIG. 6B is a block diagram illustrating another example of permissions matrix chaining according to embodiments of the present invention.

FIG. 6B is a block diagram illustrating an example of a set of permission lists that employ a separate set of pointer structures (referred to as chaining) in order to simplify the set of permission list structures necessary to support the present invention. As before, an entry in permissions matrix 500 is a pointer to the desired set of permission lists. However, in contrast to the structures shown in FIG. 6A, the given entry in permissions matrix 500 points to one of a number of pointer blocks (depicted in FIG. 6B as pointer blocks 650, 655 and 660). As can be seen, pointer block 650 points to both a permission list 665 and pointer block 655. In a similar fashion, pointer block 655 points at a permission list 670, as well as pointer block 660. Similarly, pointer block 660 points at a permission list 675, but in contrast, also points at an implicit deny 680, which terminates the pointer chain. It will be apparent that complex structures can be created using this approach, allowing a user to make different use of permission lists by judicious use of pointers.

In the architecture depicted in FIG. 6B, each of the entries of permissions matrix 500 points to a pointer block, such as pointer block 650. Pointer block 650 points both at a permission list (e.g., permission list 665) and either another pointer block (e.g., pointer block 655) or an implicit deny (e.g., implicit deny 680). Thus, each permission list (e.g., permission lists 665, 670 and 675) are available to any one of the pointer blocks that makes up the overall permission list ultimately implemented for a given entry in permissions matrix 500. Such an architecture allows for the efficient use of permission lists by requiring only one such permission list for any type of permission that might be implemented. Thus, for each set of permissions, the system merely implements a set of pointer blocks and causes those pointer blocks' permission list pointers to point at the permission lists necessary to implement the desired set of permissions. Since each of these permissions can be reused any number of times, the space consumed by such an implementation is significantly less than it might otherwise be.

Figure 6C:
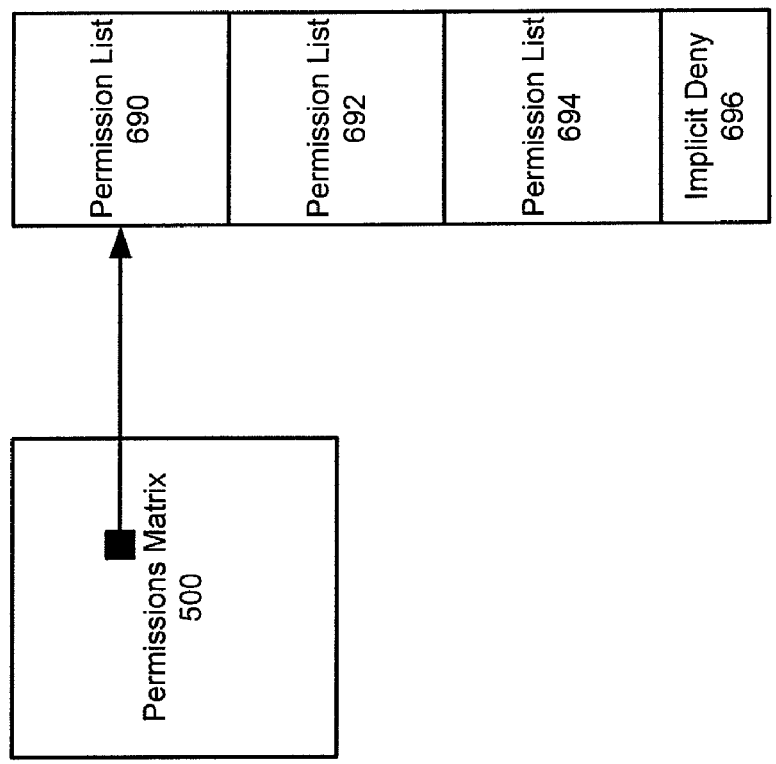
FIG. 6C is a block diagram illustrating a logical view of the examples of permissions matrix chaining depicted in FIGS. 6A and 6B according to embodiments of the present invention.

FIG. 6C is a block diagram illustrating a logical view of the examples of permissions matrix chaining depicted in FIGS. 6A and 6B according to the present invention. As noted in both examples, the given entry of permissions matrix 500 points to the first of a number of permission lists (depicted in FIG. 6C as permission lists 690, 692 and 694), which are terminated by an implicit deny 696, in the manner previously discussed.

Thus, in a software based implementation, a tree-based, hash-based, or other such lookup structure can be employed, with the lookup being a match on the concatenation of the source and destination user groups. The result of the lookup is a pointer to a chain of ACLs. These ACLs are traversed in the order they are present in the chain. The ACLs are viewed logically as a single chained ACL.

In many ACL implementations, two approaches are typically employed. One approach is the network processor-based (software) model. This type of implementation is similar to the software implementation and may benefit from that approach. The other approach is using a CAM-based solution. The following section focuses on the CAM-based implementation.

An Example of a Hardware-Based Permissions Architecture Implemented Using Role-Based Access Control Lists A CAM-based implementation provides the advantage of a parallel lookup and the ability to mask fields. Parallel lookup provides high, predictable, and consistent performance. Unfortunately, the single lookup creates an enormous amount of complexity for software programming of the device, because the typical implementation assumes sequential processing.

If the number of groups supported by a platform is small (e.g., less than 256), an ASIC implementation of the permission matrix may be feasible using on-chip memory. In such a scenario, the output of the matrix provides a label (e.g., a flow label) which can then be used to perform a CAM lookup in a manner similar to that of traditional CAM-based ACL implementations.

The likely case, however, is that the number of groups to be supported will be much larger, making an on-chip implementation infeasible. The permissions determination and permissions enforcement are thus typically implemented together within the CAM lookup itself. Using a single flow label for the RBACL lookup, the source and destination groups can be placed in the CAM flow specification in the place of the source and destination network addresses (e.g., IP addresses).

Figure 7:
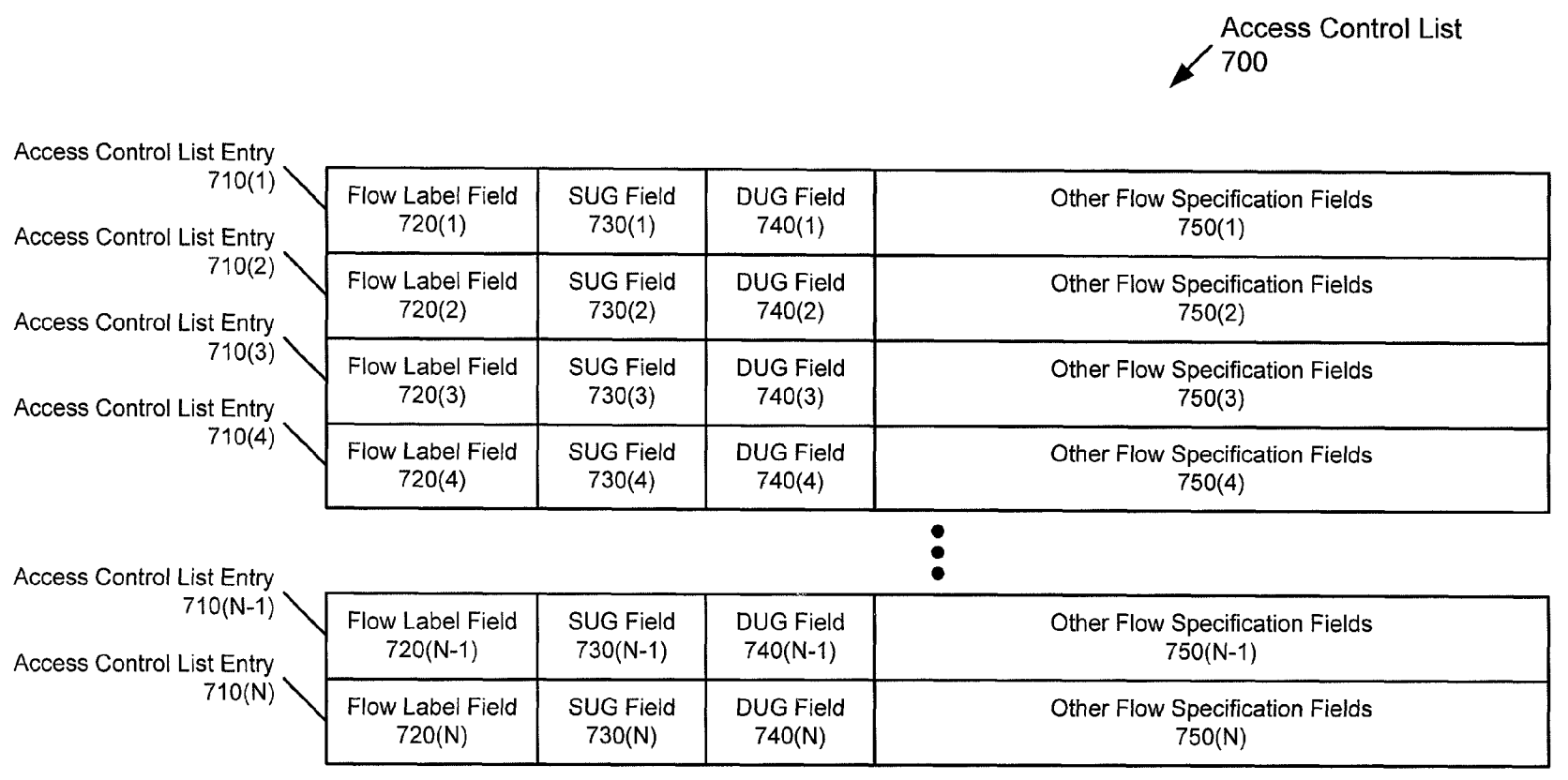

FIG. 7 is a block diagram illustrating an example of an access control list (ACL) according to the present invention, and depicted as access control list 700. Access control list 700 includes a number of entries (referred to as access control list entries or ACEs), which are depicted in FIG. 7 as access control list entries 710(1)-(N). Each of ACEs 710(1)-(N) include, for example, a flow label (depicted in FIG. 7 as flow label fields 720(1)-(N)), a source user group (SUG) identifier (depicted in FIG. 7 as SUG fields 730(1)-(N)), a destination user group (DUG) identifier (depicted in FIG. 7 as DUG fields 740(1)-(N)), and other flow specifications (depicted in FIG. 7 as other flow specification fields 750(1)-(N)). As is known, an ACL such as ACL 700 can be implemented using a content-addressable memory (CAM), and more specifically, a ternary CAM (TCAM), thereby providing for the fast and efficient look-up of information. An optional flow label (also referred to as an ACL label, maintained in the appropriate one of flow label fields 720(1)-(N)) is provided to distinguish RBACLs from traditional interface ACLs in the same device. A device employing only RBACLs would not need such a field.

An Example Network Employing RBACLs and Operation thereof

Figure 8A:
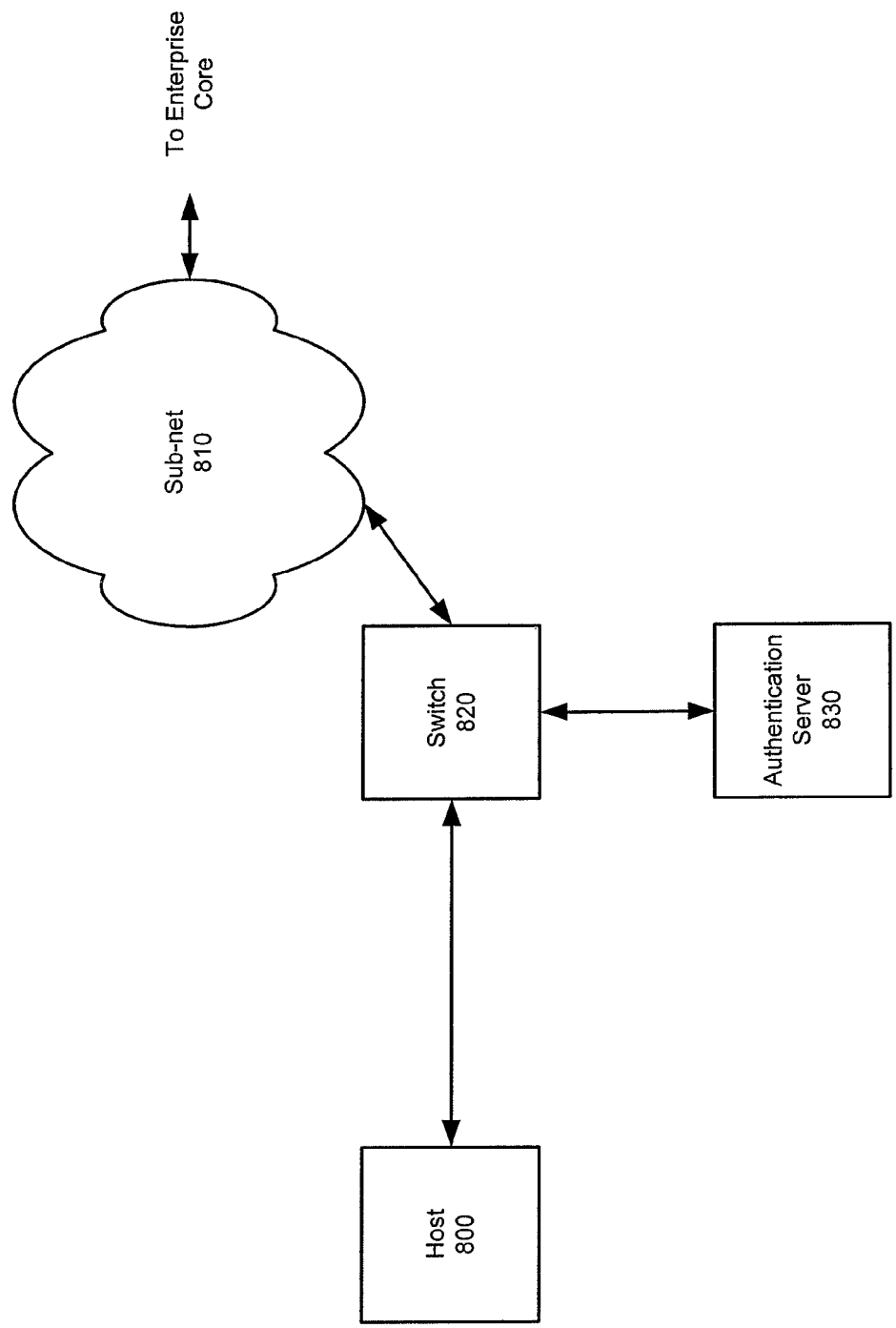
FIG. 8A is a block diagram illustrating an example of a host-side sub-net according to embodiments of the present invention.

FIG. 8A is a block diagram illustrating an example of a host-side sub-net and authentication architecture according to the present invention. In this architecture, a host 800 communicates with a sub-net 810 via a switch 820. A user logging into host 800 is authenticated by an authentication server 830 via switch 820, in the manner depicted and discussed in connection with FIG. 2. Thus, for example, a user logs into host 800 and is authenticated by authentication server 830 via switch 820. During this authentication, the user's user group is identified and assigned to the user as a source group tag (SGT), which corresponds to the user's role (e.g., engineering, management, marketing, sales or the like).

More specifically, a user might be in an Engineering role. Host 800 initiates authentication (e.g., via the IEEE 802.1X protocol). Under the RADIUS protocol, authentication server 830 challenges the user for a user identification and password combination. Upon successful authentication, the RADIUS Access-Acceptance assigns the user an SGT of 5, which corresponds to the Engineering role.

The MAC, VLAN of the user's computer (host 800) is inserted in the L2 table and marked as a secured MAC address. Table 2 illustrates the layer 2 table after being populated with this information.

TABLE 2

| Layer 2 table example | | | |
| --- | --- | --- | --- |
| MAC | VLAN Identifier | Port | User Group |
| 1234.ABCD.1234 | 4 | PortA1 | 5 |

Figure 8B:
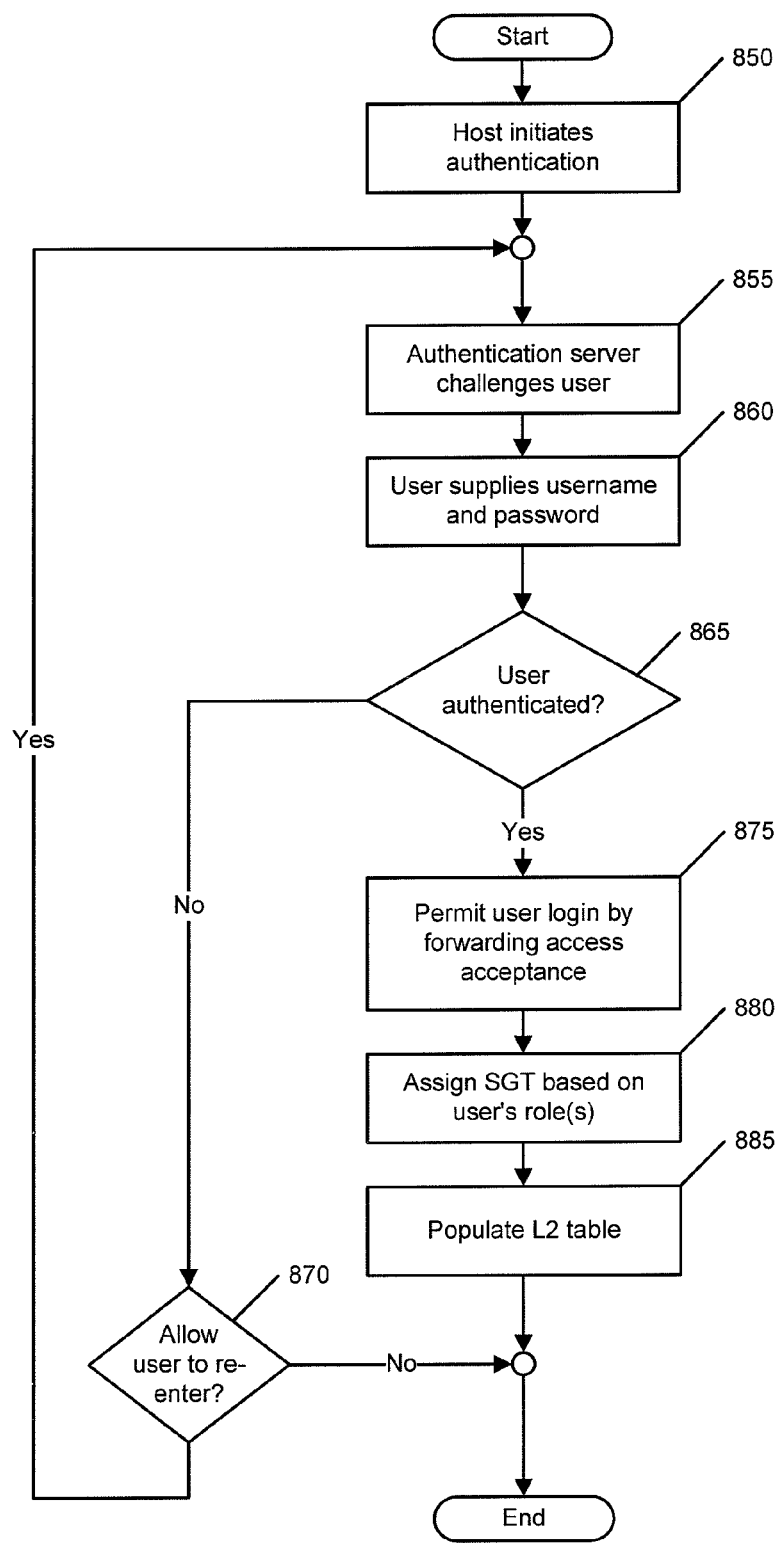
FIG. 8B is a flow diagram illustrating an example of the operation of the host-side sub-net shown in FIG. 8A, in a manner according to embodiments of the present invention.

FIG. 8B is a flow diagram illustrating an example of the operation of the host-side sub-net shown in FIG. 8A. The process begins with host 800 initiating the authentication process (step 850). Next, a challenge is issued from authentication server 830, to challenge the user for their user name and password (again, in the manner described in connection with FIG. 2) (step 855). In response to this challenge, the user supplies their username and password (step 860). A determination is then made as to whether authentication server 830 can authenticate the user (step 865). If the user can not be authenticated, a determination is made as to whether not to allow the user to re-enter their username and password (step 870). If the re-entry of this information is acceptable, process loops to authentication server 830 challenging the user (step 855). Otherwise (e.g., if either this re-entry has been allowed a maximum a number of times or is not allowed at all), the process ends.

Alternatively, if the user is authenticated (step 865), the user is permitted to log in, which is accomplished by forwarding access acceptance to host 800 (step 875). Additionally, an SGT is assigned based on the user's role(s) (step 880). This, along with other information, is used to populate the layer 2 table (i.e., forwarding table, or comparable construct) maintained by switch 820 (step 885). This completes the process of user login.

As noted, FIG. 8B depicts a flow diagram illustrating a process according to an embodiment of the present invention, as do other of the figures discussed herein. It is appreciated that operations discussed herein may consist of directly entered commands by a computer system user or by steps executed by application specific hardware modules, hut the preferred embodiment includes steps executed by software modules. The functionality of steps referred to herein may correspond to the functionality of modules or portions of modules.

The operations referred to herein may be modules or portions of modules (e.g., software, firmware or hardware modules). For example, although the described embodiment includes software modules and/or includes manually entered user commands, the various example modules may be application specific hardware modules. The software modules discussed herein may include script, batch or other executable files, or combinations and/or portions of such files. The software modules may include a computer program or subroutines thereof encoded on computer-readable media.

Additionally, those skilled in the art will recognize that the boundaries between modules are merely illustrative and alternative embodiments may merge modules or impose an alternative decomposition of functionality of modules. For example, the modules discussed herein may be decomposed into submodules to be executed as multiple computer processes, and, optionally, on multiple computers. Moreover, alternative embodiments may combine multiple instances of a particular module or submodule. Furthermore, those skilled in the art will recognize that the operations described in example embodiment are for illustration only. Operations may be combined or the functionality of the operations may be distributed in additional operations in accordance with the invention.

Alternatively, such actions may be embodied in the structure of circuitry that implements such functionality, such as the micro-code of a complex instruction set computer (CISC), firmware programmed into programmable or erasable/programmable devices, the configuration of a field-programmable gate array (FPGA), the design of a gate array or full-custom application-specific integrated circuit (ASIC), or the like.

Each of the blocks of the flow diagram may be executed by a module (e.g., a software module) or a portion of a module or a computer system user. Thus, the above described method, the operations thereof and modules therefor may be executed on a computer system configured to execute the operations of the method and/or may be executed from computer-readable media. The method may be embodied in a machine-readable and/or computer-readable medium for configuring a computer system to execute the method. Thus, the software modules may be stored within and/or transmitted to a computer system memory to configure the computer system to perform the functions of the module.

Such a computer system normally processes information according to a program (a list of internally stored instructions such as a particular application program and/or an operating system) and produces resultant output information via I/O devices. A computer process typically includes an executing (running) program or portion of a program, current program values and state information, and the resources used by the operating system to manage the execution of the process. A parent process may spawn other, child processes to help perform the overall functionality of the parent process. Because the parent process specifically spawns the child processes to perform a portion of the overall functionality of the parent process, the functions performed by child processes (and grandchild processes, etc.) may sometimes be described as being performed by the parent process.

Such a computer system typically includes multiple computer processes executing "concurrently." Often, a computer system includes a single processing unit which is capable of supporting many active processes alternately. Although multiple processes may appear to be executing concurrently, at any given point in time only one process is actually executed by the single processing unit. By rapidly changing the process executing, a computer system gives the appearance of concurrent process execution. The ability of a computer system to multiplex the computer system's resources among multiple processes in various stages of execution is called multitasking. Systems with multiple processing units, which by definition can support true concurrent processing, are called multiprocessing systems. Active processes are often referred to as executing concurrently when such processes are executed in a multitasking and/or a multiprocessing environment.

The software modules described herein may be received by such a computer system, for example, from computer readable media. The computer readable media may be permanently, removably or remotely coupled to the computer system. The computer readable media may non-exclusively include, for example, any number of the following: magnetic storage media including disk and tape storage media optical storage media such as compact disk media (e.g., CD-ROM, CD-R, etc.) and digital video disk storage media. nonvolatile memory storage memory including semiconductor-based memory units such as FLASH memory, EEPROM, EPROM, ROM or application specific integrated circuits. volatile storage media including registers, buffers or caches, main memory, RAM, and the like. and data transmission media including computer network, point-to-point telecommunication, and carrier wave transmission media. In a UNIX-based embodiment, the software modules may be embodied in a file which may be a device, a terminal, a local or remote file, a socket, a network connection, a signal, or other expedient of communication or state change. Other new and various types of computer-readable media may be used to store and/or transmit the software modules discussed herein.

Figure 9A:
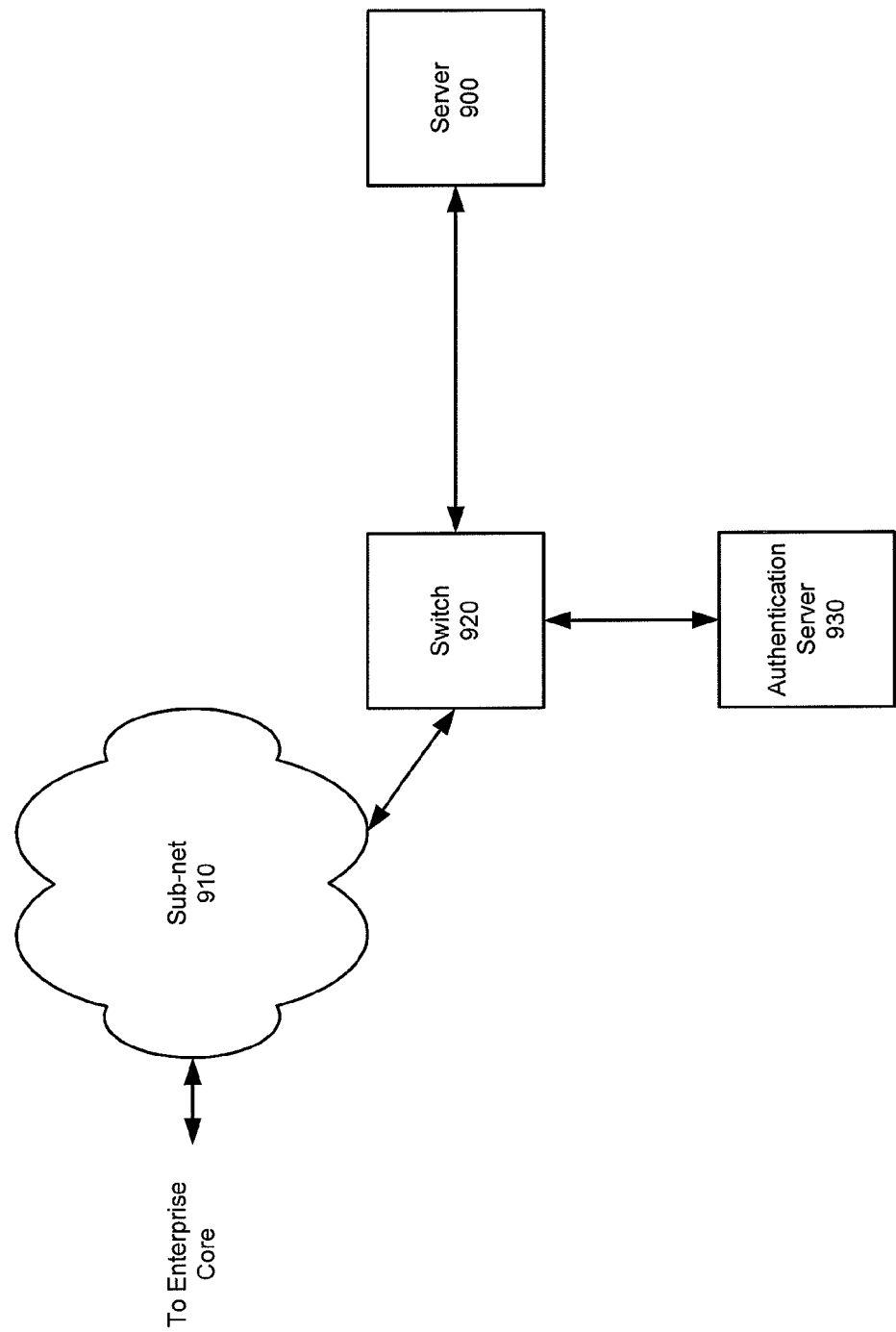
FIG. 9A is a block diagram illustrating an example of a server-side sub-net according to embodiments of the present invention.

FIG. 9A is a block diagram illustrating an example of a server-side sub-net according to the present invention. In this example, a server 900 is coupled to a sub-net 910 by a switch 920. Switch 920 also couples server 900 to an authentication server 930, which provides authentication of entities attempting to login and access sub-net 910. In this scenario, as opposed to the user authentication depicted in FIGS. 8A and 8B, the process here is the authentication of server 900 by authentication server 930.

Server 900 is authenticated in a similar manner as that used to authenticate the user's host computer (host 800). Server 900 and authentication server 930 employ an authentication protocol (e.g., IEEE 802.1X) is used to authenticate the identity or server 900. The MAC, VLAN of the server (server 900) is inserted in the layer 2 table and marked as a secured MAC address. Table 3 illustrates the layer 2 table after being populated with this information.

TABLE 3

Layer 2 table example

| MAC | VLAN Identifier | Port | User Group |
|---|---|---|---|
| 5678.1234.DCBA | 100 | PortB5 | 6 |

Figure 9B:
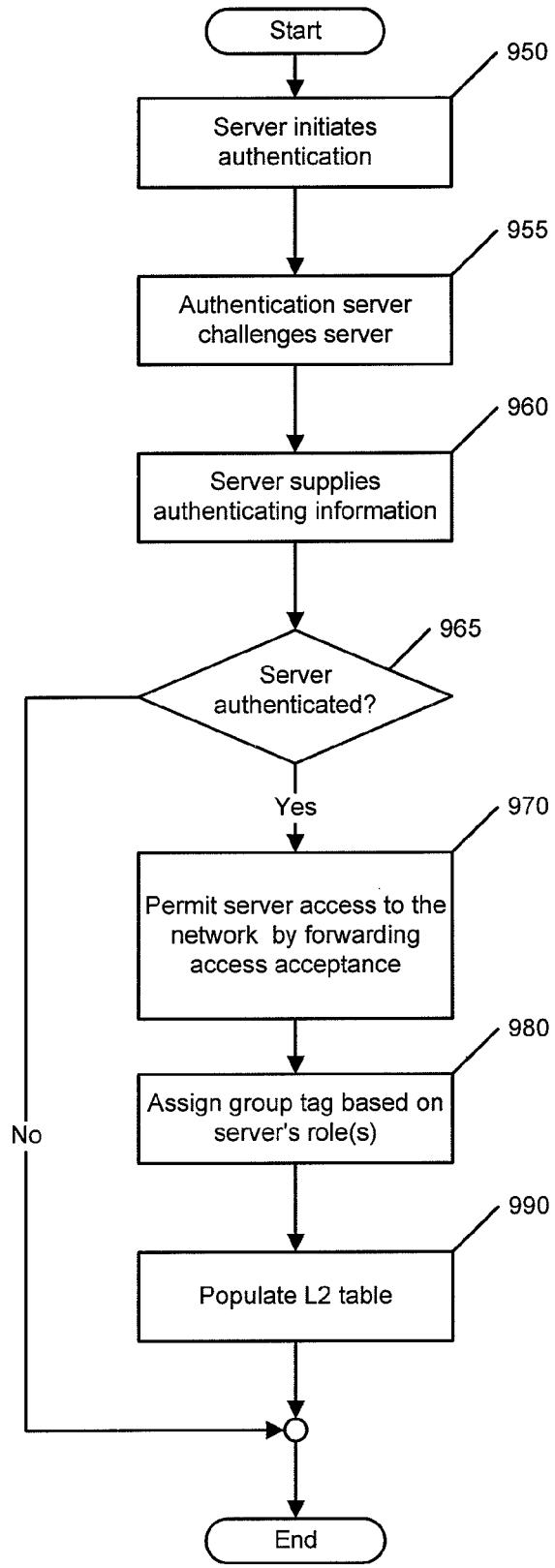
FIG. 9B is a flow diagram illustrating an example of the operation of the server-side sub-net shown in FIG. 9A, in a manner according to embodiments of the present invention.

FIG. 9B is flow diagram illustrating an example of the operation of the server-side sub-net shown in FIG. 9A. The process begins with the initiation of the authentication process by server 900 (step 950). Once authentication is initiated, authentication server 930 challenges server 900 via switch 920 (step 955). In response, server 900 supplies authenticating information to authentication server 930 via switch 920 (step 960). A determination is then made by authentication server 930 as to whether server 900 has been properly authenticated (step 965). If server 900 has failed this authentication process, the process comes to an end and server 900 is not permitted to access or be accessed by other network nodes, via the network.

However, if server 900 is authenticated (step 965), server 900 is permitted to access the network by authentication server 930 forwarding the access acceptance to switch 920 and server 900 (step 970). Additionally, a group tag (more specifically, a DGT (although, from the perspective of server 900, an SGT)) is assigned to server 900 at switch 920 based on the server's role(s) (step 975). It will be appreciated that, in fact, the question as to whether a user group is a source or destination user group is taken from the view of the direction of the packet in question. This, along with other information is used to populate the layer 2 table of switch 920 (step 980).

Figure 10:
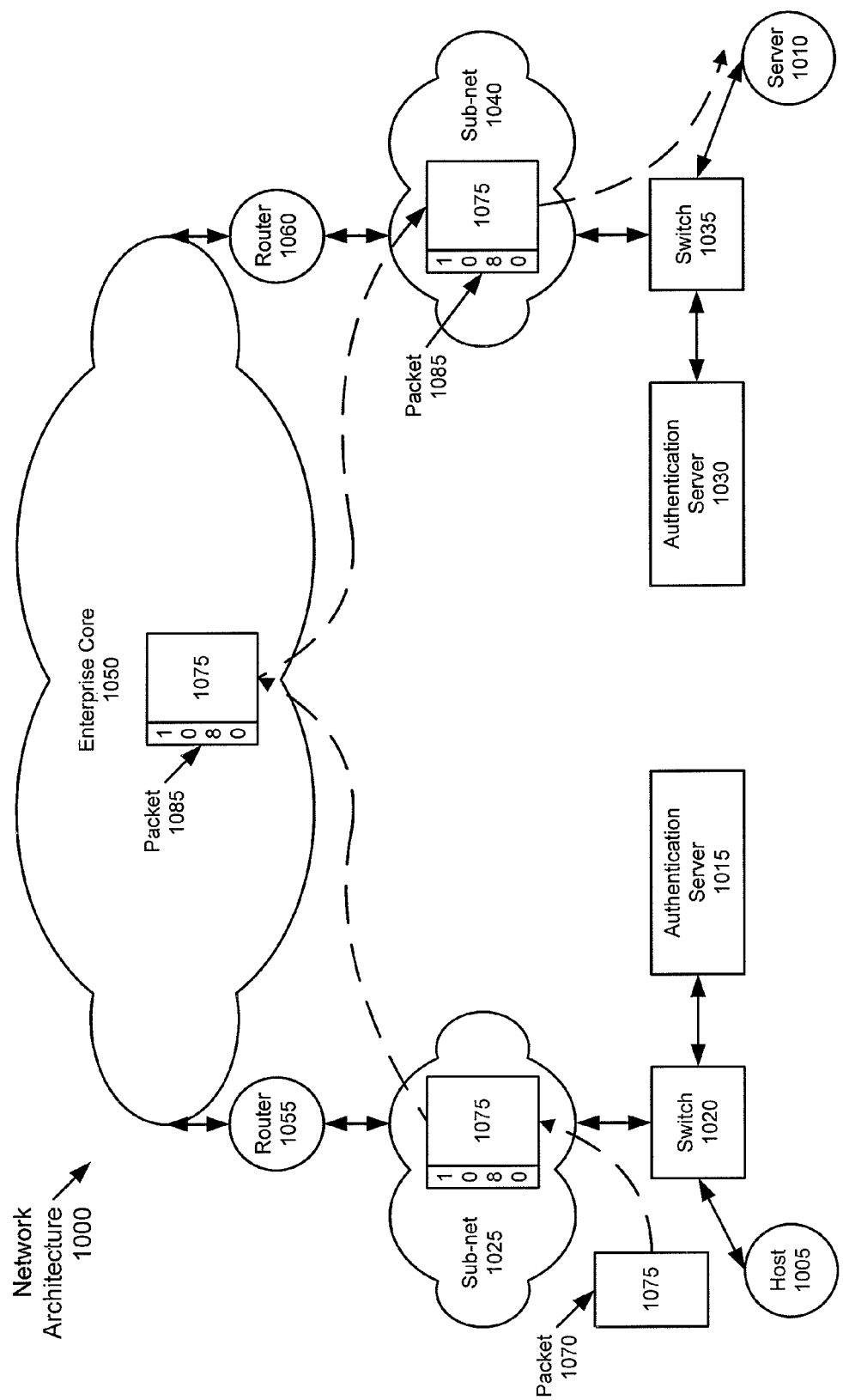
FIG. 10 is a block diagram illustrating an example of a network architecture including a host and a server, according to embodiments of the present invention.

FIG. 10 is a block diagram illustrating an example of a network architecture 1000 that includes a host 1005 and a server 1010. In the manner depicted in FIGS. 8A and 8B, host 1005 is authenticated by an authentication server 1015 via a switch 1020. Switch 1020 also provides host 1005 access to a sub-net 1025. In the manner depicted in FIGS. 9A and 9B, server 1010 is authenticated by an authentication server 1030 via a switch 1035. Switch 1035 also provides server 1010 access to (and from) a sub-net 1040. Sub-nets 1025 and 1040 are communicatively coupled to one another via an enterprise core 1050. Sub-net 1025 accesses-enterprise core 1050 via a router 1055, and similarly, sub-net 1040 access enterprise core 1050 via a router 1060.

Also shown in FIG. 10 is a packet 1070, having contents 1075. Packet 1070 is transmitted by host 1005 to switch 1020. Source user group information is added to packet 1070 by switch 1020 in the form of a source group tag 1080, based on information provided by authentication server 1015 during the authentication process, in order to create a packet 1085. As is depicted in FIG. 10, packet 1085 includes both contents 1075 and SGT 1080. Packet 1085 traverses sub-net 1025 and arrives at router 1055. Router 1055 routes packet 1085 across enterprise core 1050 to router 1060. Router 1060 presents packet 1085 to switch 1035 (and thus, server 1010) via sub-net 1040. Switch 1035 makes a determination as to whether to pass packet 1085 to server 1010 based, at least in part, on the DUG information provided to server 1010 by authentication server 1030. It will be appreciated that, alternatively, router 1060 could also be tasked with, and make, this determination.

A specific example of the traversal of network architecture 1000 by packet 1075/packet 1085 is now given. After authentication, host 1005 can send packets (e.g., packet 1075) on the network. Since RBACLs are being applied at network layer 3 in the present example, any packets the user attempts to send beyond his local sub-net (e.g., sub-net 1025) will be subject to RBACL inspection. As will be appreciated, switches 1020 and 1035 can also employ RBACLs in the layer 2 domain (e.g., within sub-nets 1025 and 1040, respectively). However, in such a case, adjustments would likely be needed, such as basing the RBACLs on the packets' layer 3 addressing, in a manner similar to VLAN ACLs (VACLs).

If packet 1085 is the first packet to be sent from host 1005 to server 1010, an ARP process will be triggered for the destination. The sending of packet 1085 begins with the SUG (in this case, with a value of 5) being taken from SGT 1080. A FIB lookup in router 1055 for a packet have the destination of packet 1085 indicates the next hop router to which the packet should be forwarded. This Next Hop Information could be, for example, either the MAC rewrite information for router 1060, or that for a router between router 1055 and router 1060. This can be seen in Table 4, which illustrates a FIB with such contents.

TABLE 4

Example FIB (router 1055).

| CAM | Memory | |
|---|---|---|
| Prefix | User Group | Next Hop Information |
| 3.4.X.X | — | Rewrite |
| 2.3.X.X | — | |
| X.X.X.X | — | |

It will be noted that, in this example, the prefix information is contained in a CAM, while the user group and next hop information are contained in a standard memory (e.g., SRAM). The lookup is performed by using the prefix to determine which entry in memory to inspect.

When packet 1075 (later packet 1085) is sent from host 1005, packet 1075 is untagged, as noted. In this example, upon entering switch 1020, packet 1075 is tagged with SGT 1080 (which indicates a user group of 5). This user group is retrieved from the layer 2 table in the ingress switch (switch 1020) in the manner discussed previously. This packet (which is, now including SGT 1080, referred to as packet 1085) is then sent through network architecture 1000 via the routing and switching provided thereby.

At the egress router (router 1060), FIB lookup is performed. If the FIB lookup hits a locally-attached sub-net, the glean adjacency causes an ARP request to be generated for the desired server (e.g., server 1010). The ARP request is sent from router 1060 to server 1010. The ARP response is then sent from server 1010. The ingress L2 switch (switch 1040) inserts the SUG for server 1010 (or, as used by the switches/routers of network architecture 1000 (e.g., host 1005) as the DUG for packets sent to server 1010; which is set to a user group of 6) into the ARP response (in the L2 header). Router 1060 receives the ARP response and populates the FIB with the resolved host prefix, the rewrite information containing the MAC address of the host, and the destination user group (6) from the ARP response. An example of the FIB that results is shown in Table.

TABLE 5

Example FIB contents after ARP response and population.

| CAM | Memory | |
|---|---|---|
| Prefix | User Group | Next Hop Information |
| 3.4.1.1 | 6 | Rewrite |
| 3.4.X.X | — | Glean |
| X.X.X.X | — | — |

In the case where packet 1085 is a subsequent packet from host 1005 to server 1010, the tables in question should already be populated. Once the FIB of router 1060 contains the fully resolved host prefix, the next packet to server 1010 will be subject to access control. (In the embodiment of the present invention in this example, the first packet that triggered the ARP resolution is dropped.) When the subsequent packet arrives from host 1005 arrives at router 1060, router 1060 already possesses the information relating to the pertinent source and destination groups. The SUG (5) is extracted from the subsequent packet's SGT and the DUG (6) is discovered by the FIB lookup.

At this point, an ACL lookup is performed. Assuming a CAM-based implementation is employed, the lookup key into the CAM contains the packet information as well as the source and destination user groups (5 and 6). In this example, the only allowed permission between the 2 groups is web traffic (tcp port 80). Example RBACL entries are shown in Table 6.

TABLE 6

Example RBACL contents.

| SUG | DUG | Flow Specification | Result |
|---|---|---|---|
| 5 | 6 | TCP Port 80 | Permit |
| 7 | 8 | TCP Port 23 | Deny |
| ANY | ANY | ANY | Deny |

Since, in this example, the subsequent packet is indeed web traffic (destined for TCP port 80), the appropriate CAM entry is hit and transmission of the packet to sub-net 1040 (and so, on to server 1010 via switch 1035) is permitted. However, to illustrate further, if the subsequent packet had been a Telnet packet (destined for TCP port 23), the packet would hit the ANY-ANY entry in the CAM, which would not permit such transmission (effectively implementing the implicit deny present in software ACLs). A more generalized discussion of the operations described in the preceding passages is now presented in connection with FIGS. 11, 12, 13 and 14.

Figure 11:
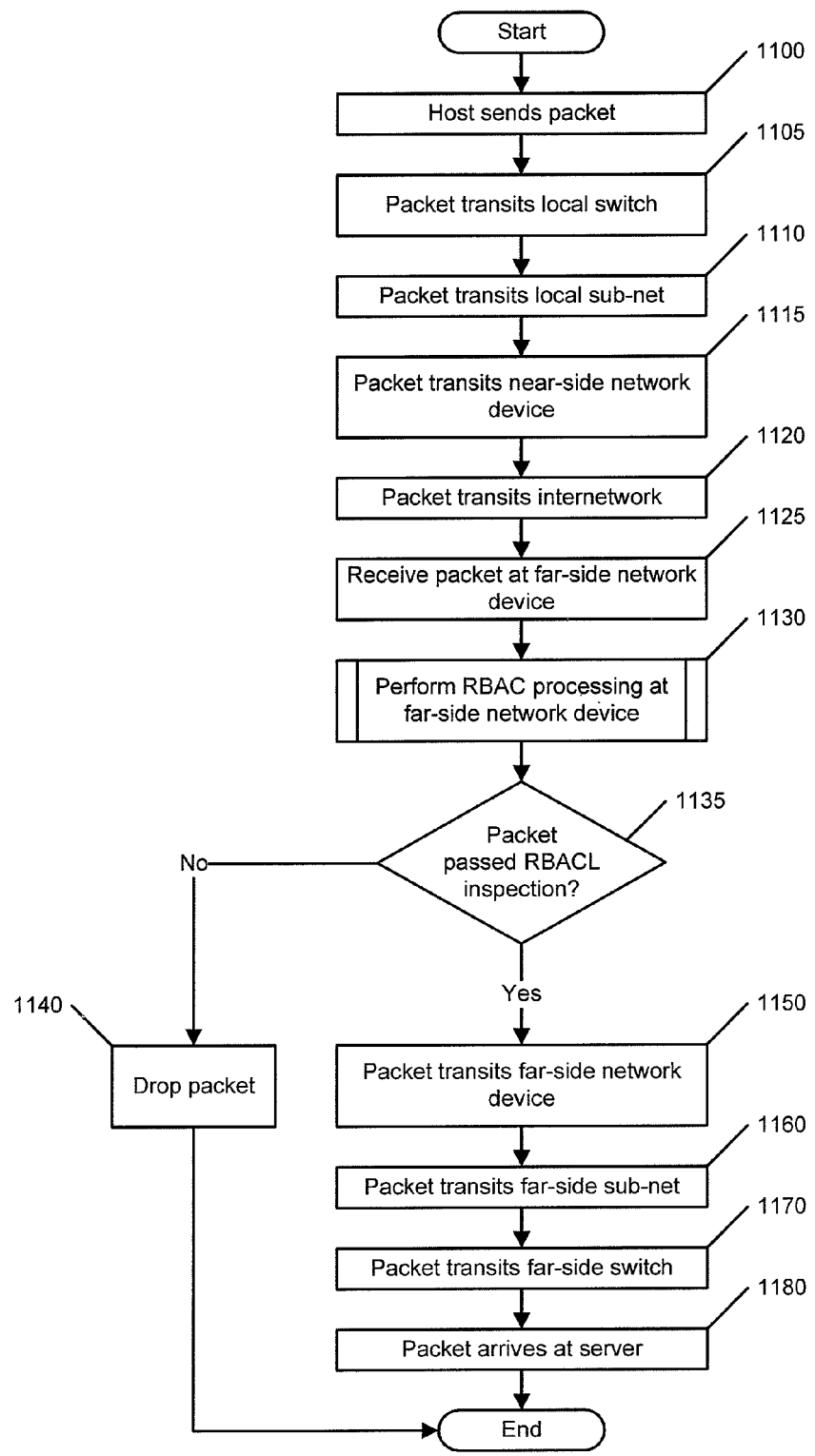
FIG. 11 is a flow diagram illustrating an example of a packet's traversal through the network architecture shown in FIG. 10 and processing performed thereon according to embodiments of the present invention.

FIG. 11 is a flow diagram illustrating a generalized example of the process of a packet's traversal through a network such as that depicted as network architecture 1000. In such a scenario, the process begins with host 1005 sending a packet (e.g., packet 1070) (step 1100). The packet thus transmitted transits the local switch (e.g., switch 1020), which tags the packet with source user group information (e.g., an SGT) (step 1105). The target packet (e.g., packet 1085) then transits the local sub-net (e.g., sub-net 1025) (step 1110). After transiting the local sub-net, the packet transits the near-side network device (e.g., router 1055) (step 1115). At this point, as noted, router 1055 routes the packet across the given internetwork (e.g., enterprise core 1050) (step 1120). After transiting the internetwork, the packet is received by the far-side network device (e.g., router 1055) (step 1125). At the far-side network device, role-based access control processing is performed (step 1130). Such processing is described in detail in connection with FIGS. 12, 13 and 14.

A determination is then made as to whether the given packet has passed the RBAC processing that is performed (step 1135). If the packet fails to pass the RBAC inspection (i.e., the RBAC processing that was performed), the packet is dropped (step 1140). As will be apparent to those skilled in the art, other actions may be performed in response to such an outcome. Alternatively, if the given packet passes RBAC inspection (step 1135), the packet is allowed to transit the far-side network device (step 1150), and then transits the far-side sub-net (e.g., sub-net 1040) (step 1160). The packet then transits the far-side switch (e.g., switch 1035) (step 1170). Finally, the packet arrives at the destination server (e.g., server 1010) (step 1180).

Figure 12:
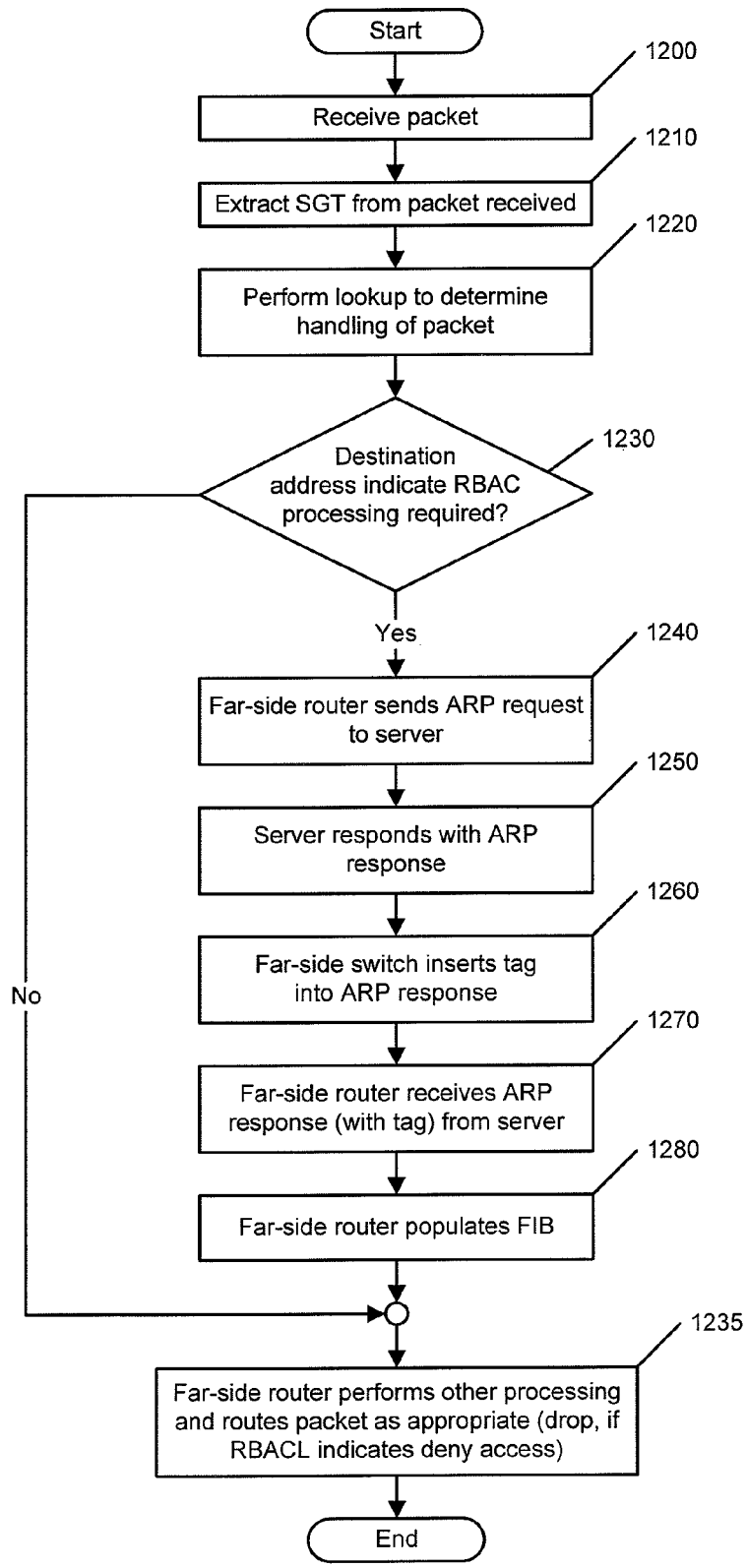
FIG. 12 is a flow diagram illustrating an example of processing performed on a packet subject to role-based access control (RBAC) processing according to embodiments of the present invention, where the packet is the first such packet received.

FIG. 12 is a flow diagram illustrating an example of the RBAC processing performed on the packet by a network device such as router 1060, in the case in which the packet is the first such packet received. The process begins with the receipt of a packet to be processed using the present invention (step 1200). First, the packet's SGT is extracted (step 1210). Next, a look-up is performed to determine how the packet should be handled (step 1220). A determination is then made as to whether the destination address of the given packet indicates that RBAC processing is required (step 1230). If the destination address indicates that RBAC processing is not required, the far-side router performs other processing on the packet, as required, and routes the packet as appropriate (step 1235).

However, if the packet's destination address indicates that RBAC processing is to be performed, the far-side router sends an address resolution protocol (ARP) request to the destination server (e.g., server 1010) (step 1240). The server responds with an ARP response (step 1250). Next, the far-side switch inserts the DGT (or SGT, from the perspective of server 1010) corresponding to the server's group, into the ARP response (step 1260). The far-side router receives this ARP response (including the DGT (or SGT, from the perspective of server 1010) indicating the DUG of server 1010) (step 1270)), and populates its forwarding information base (FIB) with this information (step 1280). As before, the far-side router then performs any other processing required, and routes the packet as appropriate (step 1235). It will be noted that, in fact, this routing may include dropping the given packet if the RBACL indicates that the network device is to deny access to the packet.

Figure 13:
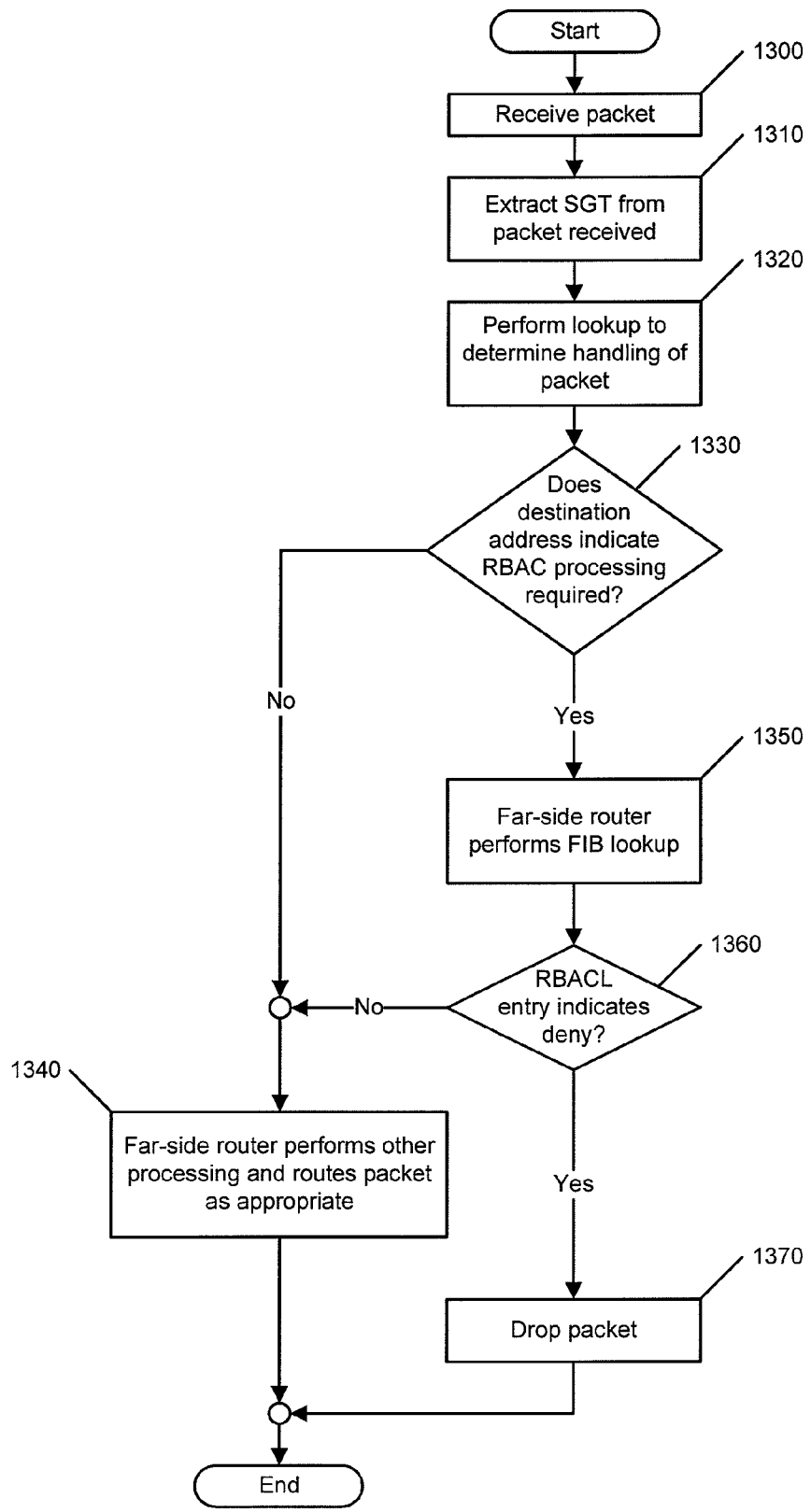
FIG. 13 is a flow diagram illustrating an example of processing performed on a subsequently-received packet subject to role-based access control (RBAC) processing according to embodiments of the present invention.

FIG. 13 is flow diagram illustrating an example of processing performed on a packet received subsequently to that of FIG. 12, while still subject to RBAC processing according to the present invention. The process begins, as before, with receipt of the given packet (step 1300). Also as before, the packet's SGT is extracted (step 1310). A look-up is performed by the network device (e.g., router 1060), in order to determine how the given packet is to be handled (step 1320). A determination is then made as to whether the packet's destination address indicates that RBAC processing is required (step 1330). If the packet's destination address does not indicate that RBAC processing is required, the far-side network device performs other processing as necessary, and routes the packet appropriately (step 1340).

However, if the far-side network device determines that the packet's destination address indicates that RBAC processing is required, the far-side network device performs a forwarding information base (FIB) look-up to determine the DUG (step 1350). The far-side network device, during egress ACL processing, then makes a determination as to whether the RBACL entry indicates that the given packet should be denied (step 1360). If the RBACL entry indicates that the packet should be denied, the packet is dropped (step 1370). Alternatively, if the RBACL entry indicates that the packet should be forwarded, the far-side network device performs other processing as necessary and routes the given packet as appropriate (step 1340).

Figure 14:
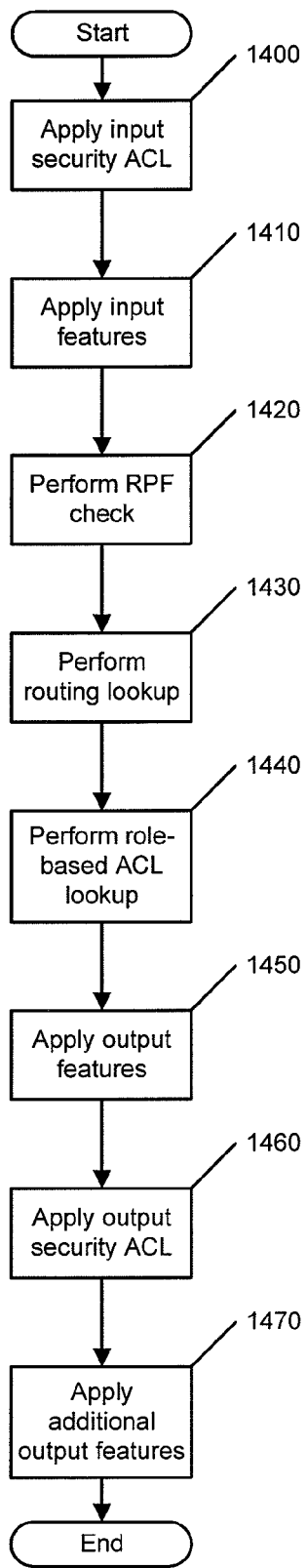
FIG. 14 is a flow diagram illustrating an example of the processing of a packet as the packet flows through the datapath of a network device according to embodiments of the present invention.

FIG. 14 is a flow diagram illustrating an example of the processing of a given packet as the packet flows through the data path of a network device implementing the present invention (e.g., router 1060). Processing begins with the packet passing through an input security ACL (step 1400). Typically, users create such ACLs in order to prevent packets posing a known threat from entering the given network device. Next, input features of the network device reply to the given packet (step 1410). Input features of the network device can include, for example, transmission control protocol (TCP) intercept, server load balancing, intrusion detection, firewall functions, web cache redirection, encryption/decryption, input QOS marking/policing, policy-based routing and the like. As will be appreciated, most of these features are specific to the ingress interface or override routing decisions that might be made within the network device.

Next, a reverse path forwarding (RPF) check is performed (step 1420). In performing the RPF check, the network device (e.g., router 1060) determines if the given packet is received on the interface the network device would be expected to use to forward a unicast packet back to the incoming packet's source. Typically, if the RPF check succeeds, the router forwards the packet to its intended destination, via the remaining actions depicted in FIG. 14. Alternatively, if the RPF check fails, the packet is discarded.

Thus, with the RPF check being passed, the router then performs routing look-up (step 1430). Next, role-based ACL look-up is performed (step 1440). It is at this point at a look-up based on the user's SUG (as indicated by the packet's SGT, or static assignment via ACL) and the server's DUG (as derived by the FIB lookup (which is derived from previous packet's SGT) or static assignment) are used to determine whether access is to be granted to the packet.

Once the packet is granted access based on the SUG/DUG combination, output features are then applied to the packet (step 1450). Examples of output features that can be implemented include, for example, intrusion detection, traffic shaping, cryptographic encryption and decryption, internet protocol (IP) accounting and the like. Restrictions governed by an output security ACL are then applied (step 1460). The output security ACL controls the forwarding of packets to ensure that, after processing by the network device, the potentially-altered packets do not pose a threat to the security of the sub-network(s) on the output side of the network device. In a similar fashion, additional output features can be applied (step 1470).

Examples of Advantages of the Present Invention

In their simplest form, RBACLs provide access control between groups of network devices. The group assignment is based on the role of the individual or device within the enterprise in question. Through the application of RBAC concepts to the network, the user benefits in a number of significant ways. The advantages of an approach according to the present invention include improved scalability of the network, improved flexibility in network configuration and improved manageability of the network.

The first, scalability, addresses the problem of multiplicative increases in resource consumption as users are added to the network. For example, the present invention addresses the ACL "explosion" problem by multiplicatively reducing the ACL's size. In general, the ACL's size (in terms of numbers of ACL entries (ACEs)) has been reduced from:

$$NUM_{ACEs} = NUM_{SOURCE\_ADDRs} * NUM_{DEST\_ADDRs} * NUM_{PERMISSIONS}$$

to:

$$NUM_{ACEs} = NUM_{SOURCE\_GROUPs} * NUM_{DEST\_GROUPs} * NUM_{PERMISSIONS}$$

Of the three elements (sources, destinations, permissions), the number of permissions is often the smaller of the three elements. As can be seen, it is reasonable to expect that:

$$NUM_{SOURCE\_ADDRs} >> NUM_{SOURCE\_GROUPs}$$

and:

$$NUM_{DEST\_ADDRs} >> NUM_{DEST\_GROUPs}$$

That being the case, one of the multiplicative terms is a relatively small number, with the other two multiplicative terms having been substantially reduced, reducing the number of ACEs multiplicatively. For example, in an ACL, if we assume 20 different sources (client PCs or sub-nets), 5 different destinations (servers), and 4 permissions (allowing web, FTP and SMTP mail) between them, this would create an ACL with 400 ACEs. If we assumed that the sources are all of the same group (reasonable, since either a source is either a group member, or is subject to an implicit deny), and that the destinations are all of the same group (under the same reasoning), the same example using RBACLs would use only 4 ACEs, a two order-of-magnitude reduction in size.

Further enhancing the scalability aspects of implementations of the present invention is the fact that the RBACL permission set can be reused in a much more effective manner than existing ACLs. For example, assume the Engineering group is allowed TCP port 80 (www) access to the Engineering Web Server group. The permission list consists of 1 ACE (permit www) and denies all other traffic. This same permission list can be reused for the Marketing group communicating to the Marketing Web server group. Such reuse with traditional ACLs is not possible.

An ancillary benefit of the present invention is that, given the substantially reduced size of RBACLs when compared to existing ACLs, the decrease in size results in a significant increase in software performance, which is in direct proportion to the reduction in ACL size. In other words, an increase (potentially, a multiplicative increase) in the performance of software RBACLs as compared to traditional ACLs can be expected.

Another major benefit of RBACLs is the decoupling of network topology from the security policy, providing a much more flexible approach to network traffic control. Although ACLs have been present in networking devices for a very long time, ACLs have failed to penetrate the enterprise. The main placement of ACLs to date has been at the perimeter of the network, typically between the enterprise and the Internet. The constant change experienced within most enterprises has made the implementation and use of ACLs an unmanageable proposition. Some examples of such constant change include:

1. Users continuously updating network addresses (e.g., updating IP addresses via DHCP)
2. Users' physical mobility
3. Sub-netting
4. Constant changes being made to the enterprise network's general topology
5. Constant addition of new devices/users to the network The flexibility provided by RBACLs allows users to move anywhere in the network without causing untoward effects on the security policy. Once authenticated and assigned to a user group, the permissions can be applied regardless of the user's position in the network. The RBACL itself does not change, because the relevant groups and security policy remain unchanged. In a sense, the user's security policy follows them around the network. No matter where the user logs in or the physical switch/router to which the user is connected, the security policy applied remains the same.

The manageability provided by RBACLs is perhaps its biggest advantage. This is closely related to the advantages RBACLs provide with respect to scalability and the flexibility. The scalability that RBACLs provide improves network management by allowing a network administrator to review the RBACL and understand its effects (i.e., the goals that the RBACL is intended to accomplish). With a traditional ACL that may be hundreds or even thousands of lines long, understanding exactly what will be done for a given flow is nearly impossible.

The RBACL's decreased size also allows the RBACL, to be installed on routers/switches throughout an enterprise's network. The decoupling of network topology from the security policy being implemented makes it possible to move the same RBACL anywhere in the network, since RBACLs are not affected by the network's topology. The network addresses and the ingress/egress interfaces do not impact the definition of the RBACL. This enables user movement throughout the network (and so, enterprise), since their permissions will be enforced in all network devices.

As users are added to the network or new servers are installed, traditional ACLs must be updated to include the new user/device. This involves great cost, especially as the ACL becomes larger and larger. With each change, there is a risk of a network outage or a security hole. This risk increases in direct proportion to the size of the ACL. Also, as the ACL size increases, software performance decreases in direct proportion. In a large organization, when an ACL needs to be updated, the organization's security team must evaluate and insert the appropriate entries. This modified ACL is then tested by the organization. Eventually, the revised and tested ACL will be installed through coordination with the organization's network management team. The cost of such a process can be substantial. In a similar scenario, using RBACLs, the new server is simply added to the appropriate group. There is no change to the ACL and the permissions appropriate to the group will automatically be applied.

While particular embodiments of the present invention have been shown and described, it will be obvious to those skilled in the art that, based upon the teachings herein, changes and modifications may be made without departing from this invention and its broader aspects and, therefore, the appended claims are to encompass within their scope all such changes and modifications as are within the true spirit and scope of this invention. Moreover, while the invention has been particularly shown and described with reference to these specific embodiments, it will be understood by those skilled in the art that the foregoing and other changes in the form and details may be made therein without departing from the spirit or scope of the invention.

What is claimed is:

1. A method comprising:
comparing, using a processor of a network device, a user group of a packet with a user group of a destination of said packet, wherein
said user group of said packet is a source user group,
said user group of said destination is a destination user group,
said destination user group is identified by a user group identifier,
said destination user group is assigned to said destination based on a role of said destination,
said user group identifier is configured to be stored in a forwarding information base, said user group identifier being stored in said forwarding information base as a result of being received in a response from another network device, said response being received in response to a request sent to said another network device by said network device, and
said user group identifier is further configured to be retrieved from said forwarding information base for use in said comparing for securing access to a network by a user based on a user's role.

2. The method of claim 1, wherein
said user group of said destination of said packet is identified by a user group identifier, and
said user group identifier is stored in a role-based access control list entry of an access control list.

3. The method of claim 1, wherein
said user group of said packet is a source user group, and
said user group of said destination of said packet is a destination user group.

4. The method of claim 3, wherein
said source user group is assigned to a source of said packet based on a role of said source, and
said destination user group is assigned to said destination based on a role of said destination.

5. The method of claim 3, further comprising:
retrieving said destination user group from said forwarding information base.

6. The method of claim 5, further comprising:
storing said destination user group in an access control list.

7. The method of claim 3, wherein
said source user group is indicated by a source user group identifier stored in said packet, and
said destination user group is indicated by a destination user group stored in a network device receiving said packet.

8. The method of claim 3, further comprising:
determining said source user group; and
determining said destination user group by looking up said destination user group in an access control list.

9. The method of claim 8, wherein
said destination user group is identified by a destination user group identifier, and
said destination user group identifier is stored in a role-based access control list entry of said access control list.

10. The method of claim 8, wherein
said access control list is a role-based access control list.

11. The method of claim 8, wherein said determining said source user group comprises:
extracting a source user group identifier from said packet, wherein
said source user group identifier identifies said source user group.

12. The method of claim 11, further comprising:
populating said access control list with a destination user group identifier, wherein
said destination user group identifier identifies said destination user group.

13. The method of claim 12, wherein
said destination user group is assigned to said destination based on a role of said destination.

14. The method of claim 12, wherein
said comparing and said populating are performed by a network device, and
said populating comprises
sending a request to another network device, and
receiving a response from said another network device, wherein
said response includes a destination user group identifier, and
said destination user group identifier identifies said destination user group.

15. A computer program product embedded in a non-transitory computer readable storage medium having a computer program recorded therein or thereon, when executed by a processor, results in a machine performing the functions for securing access to a network by a user based on a user's role, wherein the computer program product comprising:
a plurality of instructions, comprising
a first set of instructions, executable on a computer system, configured to compare a user group of a packet with a user group of a destination of said packet, wherein
said user group of said packet is a source user group,
said user group of said destination is a destination user group,
said destination user group is identified by a user group identifier,
said destination user group is assigned to said destination based on a role of said destination,
said user group identifier is configured to be stored in a forwarding information base, said user group identifier being stored in said forwarding information base as a result of being received in a response from another network device, said response being received in response to a request sent to said another network device by said network device, and
said user group identifier is further configured to be retrieved from said forwarding information base for use by said first set of instructions for use in said comparing for securing access to a network by a user based on a user's role; and
a computer readable medium, wherein said instructions are encoded in said computer readable medium.

16. The computer program product of claim 15, wherein
said user group of said packet is a source user group, and
said user group of said destination of said packet is a destination user group.

17. The computer program product of claim 16, further comprising:
a second set of instructions, executable on said computer system, configured to retrieve said destination user group from said forwarding information base.

18. The computer program product of claim 17, further comprising:
a third set of instructions, executable on said computer system, configured to storing said destination user group in an access control list.

19. The computer program product of claim 16, further comprising:
a second set of instructions, executable on said computer system, configured to determine said source user group; and
a third set of instructions, executable on said computer system, configured to determine said destination user group by looking up said destination user group in an access control list.

20. The computer program product of claim 19 wherein said second set of instructions comprises:
a first subset of instructions, executable on said computer system, configured to extract a source user group identifier from said packet, wherein
said source user group identifier identifies said source user group.

21. The computer program product of claim 20, further comprising:
a fourth set of instructions, executable on said computer system, configured to populate said access control list with a destination user group identifier, wherein
said destination user group identifier identifies said destination user group.

22. The computer program product of claim 15, wherein
said source user group is indicated by a source user group identifier stored in said packet, and
said destination user group is indicated by a destination user group stored in a network device receiving said packet.

23. A network device comprising:
a forwarding information base, wherein
said forwarding information base is configured to store a user group identifier;
means for storing said user group identifier in said forwarding information base, wherein
said means for storing is coupled to said forwarding information base,
said means for storing is responsive to said user group identifier being received in a response from another network device, and
said network device is configured to receive said response in response to a request sent to said another network device by said network device;
means for retrieving said user group identifier from said forwarding information base, wherein
said means for retrieving is coupled to said forwarding information base; and
means for comparing a user group of a packet with a user group of a destination of said packet for securing access to a network by a user based on a user's role, wherein
said means for comparing is coupled to said means for retrieving,
said user group of said packet is a source user group,
said user group of said destination is a destination user group,
said destination user group is identified by said user group identifier, and
said destination user group is assigned to said destination based on a role of said destination.

24. The apparatus of claim 23, wherein
said user group of said packet is a source user group, and
said user group of said destination of said packet is a destination user group.

25. The apparatus of claim 24, further comprising:
means for retrieving said destination user group from said forwarding information base.

26. The apparatus of claim 25, further comprising:
means for storing said destination user group in an access control list.

27. The apparatus of claim 24, wherein
said source user group is indicated by a source user group identifier stored in said packet, and
said destination user group is indicated by a destination user group stored in a network device receiving said packet.

28. The apparatus of claim 24, further comprising:
means for determining said source user group; and
means for determining said destination user group by looking up said destination user group in an access control list.

29. The apparatus of claim 28, wherein said means for determining said source user group comprises:

means for extracting a source user group identifier from said packet, wherein said source user group identifier identifies said source user group.

30. The apparatus of claim 29, further comprising:
means for populating said access control list with a destination user group identifier, wherein
said destination user group identifier identifies said destination user group.

* * * * *